US011518606B2

(12) United States Patent
Noth et al.

(10) Patent No.: US 11,518,606 B2
(45) Date of Patent: Dec. 6, 2022

(54) CONTAINER WITH A CODE ENCODING A SEQUENCE OF FOODSTUFF OR BEVERAGE PREPARATION OPERATIONS

(71) Applicant: SOCIETE DES PRODUITS NESTLE S.A., Vevey (CH)

(72) Inventors: Andre Noth, Pully (CH); Christian Jarisch, Lutry (CH); Christian Talon, Vufflens-le-Chateau (CH)

(73) Assignee: Societe des Produits Nestle S.A., Vevey (CH)

( * ) Notice: Subject to any disclaimer, the term of this patent is extended or adjusted under 35 U.S.C. 154(b) by 110 days.

(21) Appl. No.: 16/636,793

(22) PCT Filed: Jun. 25, 2018

(86) PCT No.: PCT/EP2018/066934
§ 371 (c)(1),
(2) Date: Feb. 5, 2020

(87) PCT Pub. No.: WO2019/029894
PCT Pub. Date: Feb. 14, 2019

(65) Prior Publication Data
US 2020/0369462 A1    Nov. 26, 2020

(30) Foreign Application Priority Data
Aug. 8, 2017    (EP) .................................. 17185291

(51) Int. Cl.
*A47J 31/44*       (2006.01)
*B65D 85/804*     (2006.01)
(Continued)

(52) U.S. Cl.
CPC ...... *B65D 85/8058* (2020.05); *A47J 31/4492* (2013.01); *G06K 1/00* (2013.01); *G06K 19/06037* (2013.01)

(58) Field of Classification Search
CPC ....... A47J 31/4492; G06K 1/00; G06K 1/121; G06K 2007/10504; G06K 19/06037; G06K 2019/06253
(Continued)

(56) References Cited

U.S. PATENT DOCUMENTS

2007/0157821 A1   7/2007  Panesar et al.
2015/0351583 A1*  12/2015 Weigelt .................. A47J 31/401
                                                                    426/232

FOREIGN PATENT DOCUMENTS

EP      1890271       2/2008
JP      2011253440 A  12/2011
(Continued)

OTHER PUBLICATIONS

Nishizaki, WO 2011/152296, Machine Translation. (Year: 2011).*
Chile Office Action for Appl No. 202000115 dated Sep. 29, 2021.
Japan Patent Office Communication for Application No. 2020-502468, Dispatch No. 299119, dated Jun. 28, 2022, 20 pages.

*Primary Examiner* — Paultep Savusdiphol
(74) *Attorney, Agent, or Firm* — K&L Gates LLP

(57) ABSTRACT

Container for a beverage preparation machine or foodstuff preparation machine, the container for containing beverage or foodstuff material comprises a code encoding preparation information, in particular preparation information for a beverage preparation machine or foodstuff preparation machine to prepare a beverage or a foodstuff with beverage or foodstuff material contained in the container, the code comprising a reference portion and a data portion. The reference portion comprises at least one reference configuration defining a virtual reference line. The data portion comprises a virtual encoding line intersecting the virtual reference line at a virtual intersection point and a sequence of data units comprising at least two data units aligned at a distance from each other along the virtual encoding line for (Continued)

encoding a sequence of operations of the preparation information. Each data unit of the sequence of data units encodes an operation of the sequence of operations, wherein a relative position of each data unit in the sequence of data units encodes a nature of the encoded operation and wherein a distance between the data unit and the virtual intersection point and/or a distance between the data unit and another data unit of the sequence of data units or of another sequence of data units encodes a value of a condition for the performance of the encoded operation.

11 Claims, 12 Drawing Sheets

(51) Int. Cl.
  *G06K 19/06* (2006.01)
  *G06K 1/00* (2006.01)

(58) Field of Classification Search
  USPC .................................................. 235/494, 375
  See application file for complete search history.

(56) References Cited

FOREIGN PATENT DOCUMENTS

| | | | | |
|---|---|---|---|---|
| JP | 2012088911 A | 5/2012 | | |
| JP | 2012141759 A | 7/2012 | | |
| JP | 2018520948 A | 8/2018 | | |
| WO | WO-2011/152296 A1 * | 12/2011 | ....... | G06K 19/06168 |
| WO | 2016103261 | 6/2016 | | |
| WO | 2016173735 | 11/2016 | | |
| WO | 2016173736 | 11/2016 | | |
| WO | 2016173738 | 11/2016 | | |
| WO | 2017144575 | 8/2017 | | |
| WO | 2017144579 A1 | 8/2017 | | |
| WO | 2017144580 | 8/2017 | | |
| WO | 2017144581 | 8/2017 | | |
| WO | 2017144582 | 8/2017 | | |

* cited by examiner

US 11,518,606 B2

CONTAINER WITH A CODE ENCODING A SEQUENCE OF FOODSTUFF OR BEVERAGE PREPARATION OPERATIONS

CROSS REFERENCE TO RELATED APPLICATIONS

The present application is a National Stage of International Application No. PCT/EP2018/066934, filed on Jun. 25, 2018, which claims priority to European Patent Application No. 17185291.6, filed on Aug. 8, 2017, the entire contents of which are being incorporated herein by reference.

FIELD OF THE INVENTION

The present invention relates to a beverage and/or foodstuff preparation system for preparing beverages and/or foodstuffs from containers such as coffee capsules. The present invention relates in particular to codes arranged on the containers, which encode preparation information to be read by a machine of the system.

BACKGROUND ART

Increasingly, systems for the preparation of beverages or foodstuffs are configured to operate using containers that comprise single-servings of beverage or foodstuff material, e.g. coffee, tea, ice cream, yoghurt. A machine of such a system may be configured for preparation by processing said material in the container, e.g. with the addition of fluid, such as milk or water, and the application of mixing thereto. Such a machine is disclosed in WO 2014/067987. Alternatively, the machine may be configured for preparation by at least partially extracting an ingredient of the material from the container, e.g. by dissolution or brewing. Examples of such machines are provided in EP 2393404 A1, EP 2470053 A1, WO 2009/113035.

The increased popularity of these machines may be partly attributed to enhanced user convenience compared to a conventional preparation machine, e.g. compared to a manually operated stove-top espresso maker or cafetière (French press).

It may also be partly attributed to an enhanced preparation process, wherein preparation information specific to the container and/or material therein is: encoded in a code on the container; read by the machine; decoded; and used by the machine to optimise the preparation process. In particular, the preparation information may comprise operational parameters of the machine, such as, for example but not exclusively: fluid temperature; preparation duration; mixing conditions; fluid volume; and fluid pressure.

Accordingly, there is a need to code preparation information on the container. Various codes have been developed. An example is provided in EP 2594171 A1, wherein a periphery of a flange of a capsule comprises a code arranged thereon. The code comprises a sequence of symbols that can be printed on the capsule during manufacture. A drawback of such a code is that its encoding density is limited, i.e. the amount of preparation information that it can encode is limited. A further drawback is that the code is highly visible and may be considered aesthetically displeasing. EP2525691 A1 discloses a container with a 2D barcode, which has a higher albeit limited encoding density.

Thus in spite of the considerable effort already invested in the development of said systems further improvements are desirable.

Accordingly, an aim of the present invention is to provide a system and a container with a code allowing for a high density of preparation information.

Another aim of the present invention is to provide a system and a container with a code having a minimal visual impact on the container's appearance.

Still another aim of the present invention is to provide a system and a container with a code allowing encoding one or more sequences of operations of the preparation information in an efficient manner.

SUMMARY OF THE INVENTION

These aims and other advantages are achieved by a container for a beverage preparation machine or foodstuff preparation machine, the container for containing beverage or foodstuff material and comprising a code encoding preparation information, in particular preparation information for a beverage preparation machine or foodstuff preparation machine to prepare a beverage or a foodstuff with beverage or foodstuff material contained in said container, the code comprising a reference portion and a data portion, the reference portion comprising at least one reference configuration defining a virtual reference line, the data portion comprising a virtual encoding line intersecting the virtual reference line at a virtual intersection point and a sequence of data units comprising at least two data units aligned at a distance from each other along the virtual encoding line for encoding a sequence of operations of the preparation information, each data unit of the sequence of data units encoding an operation of the sequence of operations, wherein a relative position of each data unit in the sequence of data units encodes a nature of the corresponding operation and wherein a distance between each data unit and the virtual intersection point and/or a distance between each data unit and another, for example an adjacent, data unit of the sequence of data units or of another sequence of data units encodes a value of a condition for the performance of the corresponding operation.

In embodiments, the virtual encoding line is closed, preferably elliptic such as for example circular, and the distance between each data unit and the virtual intersection point and/or the distance between each data unit and an adjacent data unit of the sequence of data units is an angular distance measured from a centre point, for example a geometric centre point, of the encoding line.

The operation is for example, but not exclusively, one of: starting injecting a liquid in the container, stopping injecting a liquid in the container, opening a spout of or in fluid connection with the container, closing a spout of or in fluid connection with the container, starting mixing beverage or foodstuff material contained in the container, stopping mixing beverage or foodstuff material contained in the container.

The condition for the performance of an operation is for example, but not exclusively, one of: a duration, a volume, a temperature.

In embodiments, the data portion of the code comprises a further virtual encoding line comprising a further sequence of data units for encoding a further sequence of operations of said preparation information, i.e. the data portion of the code comprises two virtual encoding lines, each virtual encoding line of said two virtual encoding lines comprising a sequence of data units, for encoding two sequences of operations of said preparation information. The two sequences of operations, i.e. the sequence of operation and the further sequence of operations, are for example to be performed simultaneously.

The data portion of the code may comprise one or more additional virtual encoding lines with data units for encoding additional parameter values of the preparation information, for example for encoding a preparation temperature value, the values of pump configuration parameters for the pump of a preparation machine, etc.

In embodiments, the data portion of the code further comprises discrete positions that each may or may not comprise a further data unit as binary units for encoding at least part of one or more further parameters of said preparation information. At least part of the discrete positions for example encode a parameter for decoding said sequence of data units, for example a parameter indicating an encoding scheme amongst several possible encoding scheme used for encoding preparation information in the particular code.

In embodiments, the reference configuration for example comprises three reference units arranged at the vertices of a virtual triangle, for example a virtual right-angled triangle.

In order to minimize the visual impact of the code on the container's appearance, the code is preferably very small and for example has a peripheral length of 600-1600 µm.

The code is for example formed on a surface of the container or on an attachment, which is attached thereto.

In embodiments, the container comprises a plurality of such codes arranged in a tessellating manner.

These aims and other advantages are achieved also by an attachment configured for attachment to a container for a beverage preparation machine or foodstuff preparation machine, the container for containing beverage or foodstuff material, the attachment comprising an attachment member for attachment to the container, and a carrier carrying a code encoding preparation information, in particular preparation information for a beverage preparation machine or foodstuff preparation machine to prepare a beverage or a foodstuff with beverage or foodstuff material contained in the container. The code comprises a reference portion and a data portion, the reference portion comprising at least one reference configuration defining a virtual reference line, the data portion comprising a virtual encoding line intersecting the virtual reference line at a virtual intersection point and a sequence of data units comprising at least two data units aligned at a distance from each other along the virtual encoding line for encoding a sequence of operations of the preparation information, each data unit of the sequence of data units encoding an operation of the sequence of operations, wherein a relative position of each data unit in the sequence of data units encodes a nature of the corresponding operation and wherein a distance between each data unit and the virtual intersection point and/or a distance between each data unit and another, for example an adjacent, data unit of the sequence of data units or of another sequence of data units encodes a value of a condition for the performance of the corresponding operation.

These aims and other advantages are achieved also by a beverage preparation system or foodstuff preparation system comprising a container as described above and a beverage preparation machine or foodstuff preparation machine, the preparation machine comprising a container processing subsystem to receive the container and to prepare a beverage or foodstuff therefrom, a code processing subsystem operable to obtain a digital image of the code of the container; process the digital image to decode the encoded preparation information, a control subsystem operable to control the container processing subsystem using the decoded preparation information, wherein the code processing subsystem is preferably configured to decode the encoded preparation information by identifying the reference configuration and determining therefrom the virtual reference line, determining the virtual encoding line from the virtual reference line and measuring distances between each data unit of the sequence of data units and the virtual intersection point and/or between each data units of the sequence of data units and another, for example adjacent, data unit of the sequence of data units or of another sequence of data units; decoding a sequence of operations of the preparation information from these distances.

These aims and other advantages are achieved also by an attachment configured for attachment to a beverage preparation machine or foodstuff preparation machine, the preparation machine comprising a container processing subsystem to receive a container containing beverage or foodstuff material and to prepare a beverage or foodstuff therefrom, a code processing subsystem operable to obtain a digital image of a code, process the digital image to decode preparation information encoded in the code, a control subsystem operable to control the container processing subsystem using the decoded preparation information, wherein the attachment comprises an attachment member for attachment to the beverage or foodstuff preparation machine, a carrier carrying a code encoding preparation information, the code comprising a reference portion and a data portion, the reference portion comprising at least one reference configuration defining a virtual reference line, the data portion comprising a virtual encoding line intersecting the virtual reference line at a virtual intersection point and a sequence of data units comprising at least two data units aligned at a distance from each other along the virtual encoding line for encoding a sequence of operations of the preparation information, each data unit of the sequence of data units encoding an operation of the sequence of operations, wherein a relative position of the data unit in the sequence of data units encodes a nature of the operation and wherein a distance between the data unit and the virtual intersection point and/or a distance between the data unit and another, for example an adjacent, data unit of the sequence of data units or of another sequence of data units encodes a value of a condition for the performance of the operation.

These aims and other advantages are furthermore achieved by a method of preparing a beverage or foodstuff using a preparation system as described above, the method comprising placing the container in the container processing system, obtaining a digital image of the code of the container and processing the digital image to decode the encoded preparation information with the code processing subsystem, controlling the container processing subsystem with the control subsystem using a sequence of operations of the decoded preparation information, wherein the decoding of the encoded preparation information comprises identifying the reference configuration and determining therefrom the virtual reference line, determining the virtual encoding line from the virtual reference line and measuring distances between each data unit of the sequence of data units and the virtual intersection point and/or between each data unit of the sequence of data units and another, for example adjacent, data unit of the sequence of data units or of another sequence of data units, decoding the sequence of operations of the preparation information from the distances.

In embodiments, the invention also relates to the use of a code for preparing a foodstuff or beverage according to the method described above and using a preparation system as previously described.

These aims and other advantages of the invention are achieved also by a method of encoding preparation information, the method comprising forming a code on a container for a beverage preparation machine or foodstuff preparation machine, the container for containing beverage or foodstuff material or on an attachment for attachment to such a container or to a beverage preparation machine or foodstuff preparation machine, the method comprising forming at least one reference configuration defining a virtual reference line of the code, defining a virtual encoding line intersecting the virtual reference line at a virtual intersection point and forming a sequence of data units comprising at least two data units aligned at a distance from each other along the virtual encoding line for encoding a sequence of operations of the preparation information, each data unit of the sequence of data units encoding an operation of the sequence of operations, wherein a relative position of the data unit in the sequence of data units encodes a nature of the operation and wherein a distance between the data unit and the intersection point and/or a distance between the data unit and another, for example an adjacent, data unit of the sequence of data units or of another sequence of data units encodes a value of a condition for the performance of the operation.

These aims and other advantages are furthermore achieved by a computer program executable on one or more processors of a code processing subsystem of a beverage preparation machine or foodstuff preparation machine, the computer program executable to process a digital image of a code of a container according to the invention to decode encoded preparation information, wherein the decoding preferably comprises identifying the reference configuration and determining therefrom the virtual reference line, determining the virtual encoding line from the virtual reference line and measuring distances between each data unit of the sequence of data units and the intersection point and/or between each data unit of the sequence of data units and another, for example adjacent, data unit of the sequence of data units or of another sequence of data units, decoding the sequence of operations of the preparation information from these distances, and/or by a non-transitory computer readable medium comprising such a computer program.

BRIEF DESCRIPTION OF FIGURES

The invention will be better understood thanks to the following detailed description of several embodiments with reference to the attached drawings, in which.

DETAILED DESCRIPTION OF THE INVENTION

Beverage/Foodstuff Preparation System

Figure 1A:
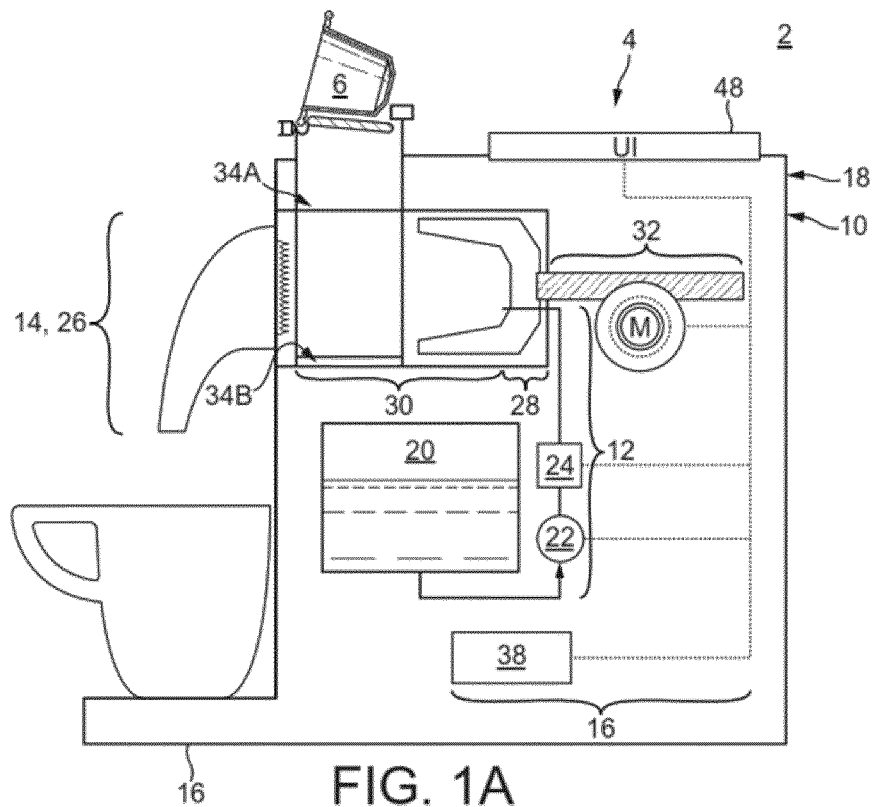
FIG. 1A shows an example of a beverage or foodstuff preparation system according to the invention.
Figure 1B:
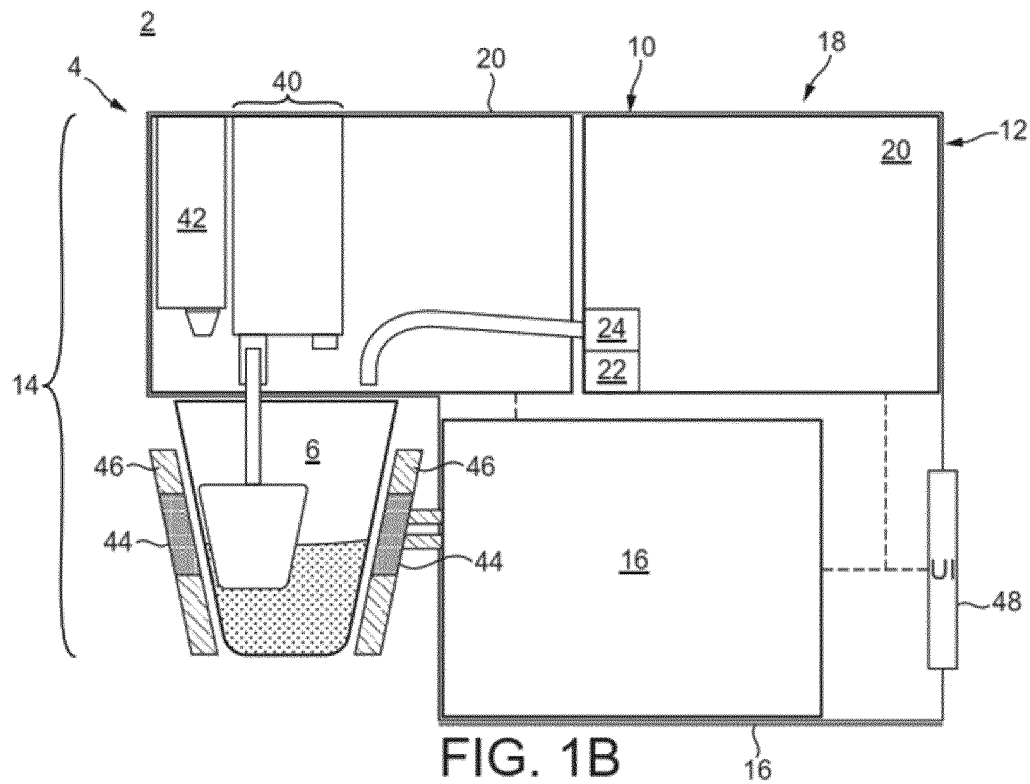
FIG. 1B shows another example of a beverage or foodstuff preparation system according to the invention.

A beverage or foodstuff preparation system 2, embodiments of which are illustrated in FIGS. 1A and 1B, comprises: a beverage or foodstuff preparation machine 4; a container 6, which are described further below.

Preparation Machine

The beverage or foodstuff preparation machine 4 is operable to process a beverage or foodstuff material (hereon material) arranged in the container 6 to a beverage and/or foodstuff for consumption by drinking and/or eating. Processing may comprise the addition of fluid, such as water or milk to said material. A foodstuff material as defined herein may comprise a substance capable of being processed to a nutriment generally for eating, which may be chilled or hot. The foodstuff is for example a liquid or a gel, non-exhaustive examples of which are: yoghurt; mousse; parfait; soup; ice cream; sorbet; custard; smoothies. The foodstuff may also be a cooked, baked and/or extruded foodstuff, non-exhaustive examples of which are pastries; bread; pizza; pasta; prepared dishes. A beverage material as defined herein may comprise a substance capable of being processed to a potable substance, which may be chilled or hot, non-exhaustive examples of which are: tea; coffee, including ground coffee; hot chocolate; milk; cordial. It will be appreciated that there is a degree of overlap between both definitions, i.e. in embodiments a said machine 4 can prepare both a foodstuff and a beverage.

The machine 4 is generally dimensioned for use on a work top and/or as a built-in kitchen appliance, i.e. it is preferably less than 80 cm in length, width and height.

The machine 4 comprises: a housing 10; a container processing subsystem 14; a control subsystem 16; and a code processing subsystem 18.

Housing

The housing 10 houses and supports the aforesaid machine components and preferably comprises: a base for abutment of a horizontally arranged support surface; a body for mounting thereto said components. In embodiments, the housing additionally or alternatively comprises elements for attaching and securing the machine into kitchen furniture as a built-in kitchen appliance.

Container Processing Subsystem

Depending on the particular embodiment the container processing subsystem 14 (which may also be considered a preparation unit) may be configured to prepare a foodstuff/beverage by processing material arranged in: one or more single-serving, single use container 6 that is a packet and/or capsule; a container 6 that is a receptacle for end-user consumption therefrom. In particular the material is processed to effect a change of its composition, e.g. by dissolution, extraction, mixing, extrusion, baking and/or cooking of an ingredient thereof. Embodiments of some configurations will be discussed.

Two or more such configurations may be combined in a single container processing subsystem in order for example to prepare a foodstuff/beverage from material contained in two or more containers requiring different processing. In embodiments, a container processing subsystem may for example be configured to simultaneously or sequentially: in a pressurised extraction unit, extract coffee from a capsule containing ground coffee and; in a dissolution unit, dilute powdered milk contained in a packet; in order to prepare a milk and coffee beverage such as for example a cappuccino, a cafe latte or a latte macchiato. In other embodiments, a container processing subsystem may for example be configured to simultaneously or sequentially: prepare at least part of a foodstuff/beverage in a receptacle for end user consumption in a mixing unit and; optionally dilute material contained in a container before dispensing it into the receptacle; in order for example to prepare a serving of ice-cream with topping or a flavoured milk-shake. Other feature combinations in a single container processing subsystem are possible within the frame of the invention in order to allow the preparation of foodstuff/beverages according to other complex recipes.

In embodiments, and with reference to FIGS. 1A and 1B, the container processing subsystem 14 comprises a fluid supply 12 that is operable to supply fluid to the container 6. The fluid is for example water or milk. The fluid may be conditioned (i.e. heated or cooled). The fluid supply 12 typically comprises: a reservoir 20 for containing fluid, for example 1-5 litres of fluid; a fluid pump 22, such as a reciprocating or rotary pump that may be driven by an electrical motor or an induction coil (although in embodiments the pump may be replaced with connection to an external fluid supply, for example to a mains water supply); an optional fluid thermal exchanger 24 (typically a heater or a cooler), which for example comprises an in-line, thermo-block type heater; an outlet for supplying the fluid. The reservoir 20, fluid pump 22, fluid thermal exchanger 24, and outlet are in fluid communication with each other in any suitable order to form a fluid line. The fluid supply 12 may optionally comprise a sensor to measure fluid flow rate and/or the amount of fluid delivered. An example of such a sensor is a flow meter, which may comprises a hall or other suitable sensor to measure rotation of a rotor, a signal from the sensor being provided to the control subsystem 16, as will be discussed.

Container processing subsystem for Extraction of Foodstuff/Beverage from Container According to embodiments, the container processing subsystem 14 is operable: to receive the container 6 containing material; process the container 6 to extract one or more ingredients of a beverage or foodstuff therefrom, and to dispense the said ingredients into an alternate receptacle for end-user consumption. The container is generally a single-use, single-serving container such as a capsule, a pod or a packet.

A container processing subsystem 14 for use with such a capsule or pod will initially be described, an example of which is shown in FIG. 1A. The container processing subsystem 14 comprises an extraction unit 26 operable to move between a capsule receiving position and a capsule extraction position. When moving from the capsule extraction position to the capsule receiving position the extraction unit 26 may be moved through or to a capsule ejection position, wherein a spent capsule can be ejected therefrom. The extraction unit 26 receives fluid from the fluid supply 12. The extraction unit 26 typically comprises: an injection head 28; a capsule holder 30; a capsule holder loading system 32; a capsule insertion channel 34A; a capsule ejection channel or port 34B, which are described sequentially.

The injection head 28 is configured to inject fluid into a cavity of the capsule 6 when held by the capsule holder 30, and to this end has mounted thereto an injector, which has a nozzle that is in fluid communication with the outlet of the fluid supply 12.

The capsule holder 30 is configured to hold the capsule 6 during extraction and to this end it is operatively linked to the injection head 28. The capsule holder 30 is operable to move to implement the said capsule receiving position and capsule extraction position: with the capsule holder in the capsule receiving position a capsule 6 can be supplied to the capsule holder 30 from the capsule insertion channel 34A; with the capsule holder 30 in the capsule extraction position a supplied capsule 6 is held by the holder 30, the injection head 28 can inject fluid into the cavity of the held capsule, and one or more ingredients can be extracted therefrom. When moving the capsule holder 30 from the capsule extraction position to the capsule receiving position, the capsule holder 30 can be moved through or to the said capsule ejection position, wherein a spent capsule 6 can be ejected from the capsule holder 30 via the capsule ejection channel or port 34B.

The capsule holder loading system 32 is operable to drive the capsule holder 30 between the capsule receiving position and the capsule extraction position.

The aforedescribed extraction unit 26 is generally a pressurised extraction unit, e.g. the container is hydraulically sealed and subject to 5-20 bar during brewing. Generally the pump is an induction pump. The extraction unit may alternatively operate by centrifugation as disclosed in EP 2594171 A1, which is incorporated herein by reference.

The container processing subsystem 14 may alternatively or additionally comprise a dissolution unit configured as disclosed in EP 1472156 and in EP 1784344, which are incorporated herein by reference.

In the embodiment of the container comprising a packet, the container processing subsystem comprises an extraction and/or dissolution unit operable to receive the packet and to inject, at an inlet thereof, fluid from the fluid supply. The injected fluid mixes with material within the packet to at least partially prepare the beverage, which exits the packet via an outlet thereof. The container processing subsystem comprises: a support mechanism to receive an unused packet and eject a spent packet; an injector configured to supply fluid to the packet from the outlet of the fluid supply. In embodiments, the container processing subsystem is furthermore configured to open and close the container outlet in order to control dispensing of the prepared beverage or foodstuff. Further detail is provided in EP 2956386, EP 3114047 and/or in PCT/EP2017/052095, which are incorporated herein by reference.

Container Processing Subsystem for Preparation of Foodstuff/Beverage in Container for End User Consumption According to other embodiments, an example of which is shown in FIG. 1B, the container processing subsystem 14 is generally operable to prepare material stored in a container 6 that is a receptacle, such as a cup, pot or other suitable receptacle configured to hold for example approximately 150-350 ml of prepared product. Herein the container processing subsystem 14 comprises a mixing unit, which comprises: an agitator unit 40; an optional auxiliary product unit 42; a thermal exchanger 44; and a receptacle support 46, which will be described sequentially.

The agitator unit 40 is operable to agitate material within the receptacle for at least partial preparation thereof. The agitator unit 40 may comprise any suitable mixing arrangement, e.g. a: planetary mixer; spiral mixer; vertical cut mixer. Typically the agitator unit 40 comprises: an implement for mixing having a mixing head for contact with the material; and a drive unit, such as an electric motor or solenoid, to drive the mixing implement. In a preferred example of a planetary mixer the mixing head comprises an agitator that rotates with a radial angular velocity W1 on an offset shaft that rotates with gyration angular velocity W2, such an arrangement is disclosed for example in EP 2956386, which is incorporated herein by reference.

The auxiliary product unit 42 is operable to supply an auxiliary product, such as a topping, to the container 6. The auxiliary product unit 42 for example comprises: a reservoir to store said product; an electrically operated dispensing system to effect the dispensing of said product from the reservoir. Alternatively or additionally, the auxiliary production unit comprises a dilution and/or an extraction unit as described above to effect the dispensing from said auxiliary product from a container 6 such as a packet or a capsule.

The thermal exchanger 44 is operable to transfer and/or extract thermal energy from the container 6. In an example of transfer of thermal energy it may comprise a heater such as thermoblock. In an example of extraction of thermal energy it may comprise heat pump such as a refrigeration-type cycle heat pump.

The receptacle support 46 is operable to support the container 6 during a preparation process such that the container remains stationary during agitation of the material therein by the agitator unit 40. The receptacle support 46 preferably is thermally associated with the thermal exchanger 44 such that transfer of thermal energy can occur with a supported receptacle.

In a variant of the above, the container processing subsystem further comprises a dispensing mechanism for receiving a container such as a packet or capsule and dispensing the associated material into the receptacle, where it is prepared. Such an example is disclosed in EP 14167344 A, which is incorporated herein by reference. In a particular embodiment with this configuration the container may be a partially collapsible container, whereby the container is collapsible to dispense material stored therein. Such an example is disclosed in EP 15195547 A, which is incorporated herein by reference. In particular a collapsible portion of the container comprises a geometric configuration and/or portion of weakening such that said portion collapses in preference to a retaining portion upon the application of axial load through both portions. In such an embodiment the container processing subsystem comprises a mechanical actuation device configured to apply an axial load to collapse said container, an example of which is provided in the reference application.

Other Container Processing Subsystems

In still further embodiments, the container processing subsystem for example comprises an extrusion head for extruding and possibly mixing one or more materials contained in one or more containers. In still other embodiments, the container processing subsystem for example comprises an oven and/or stove for heating the material contained in a container and preparing an edible foodstuff thereof.

Control Subsystem

Figure 2A:
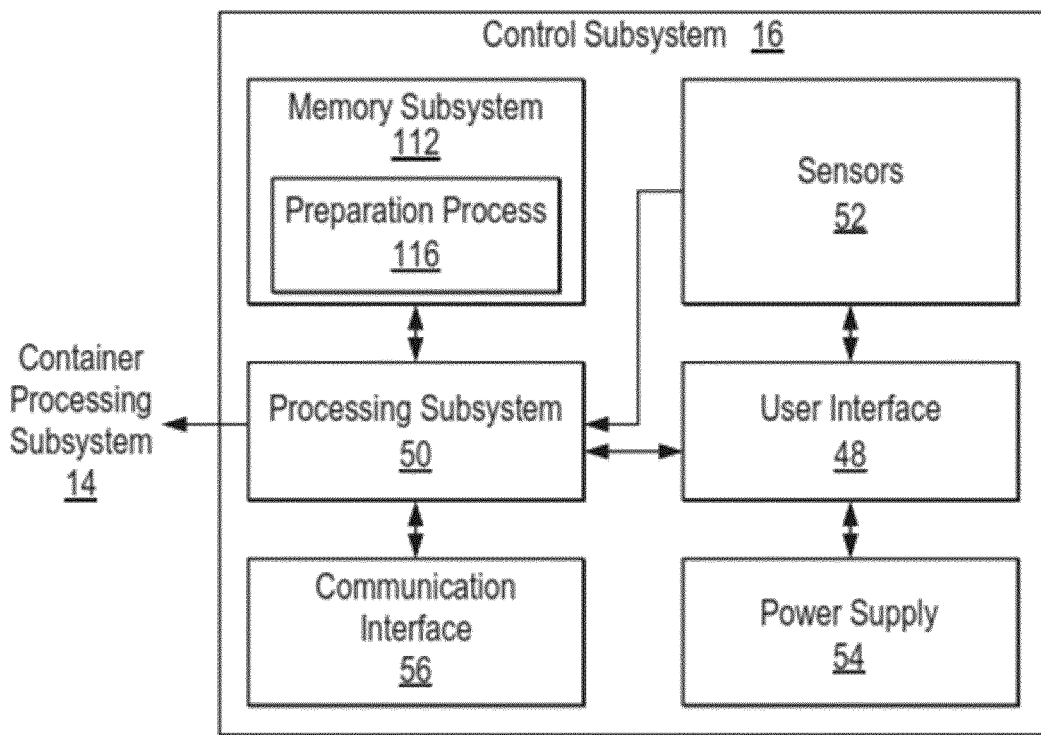
FIG. 2A is a block diagram of a control subsystem of a beverage or foodstuff preparation machine of the invention.
Figure 2B:
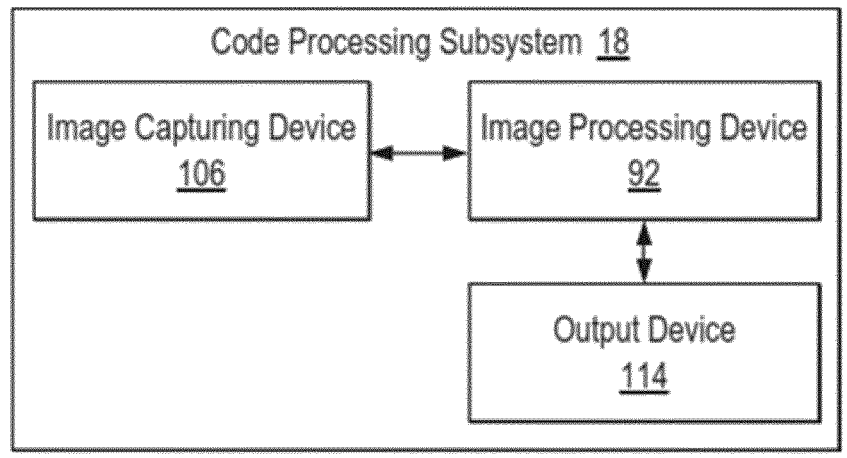
FIG. 2B is a block diagram of a code processing subsystem of a beverage or foodstuff preparation machine of the invention.

The control subsystem 16, an embodiment of which is illustrated in FIG. 2A, is operable to control the container processing subsystem 14 to prepare the beverage/foodstuff. The control subsystem 16 typically comprises: a user interface 48; a processing subsystem 50; optional sensors 52; a power supply 54, optional communication interface 56, which are described sequentially.

The user interface 48 comprises hardware to enable an end user to interface with the processing subsystem 50 and hence is operatively connected thereto. More particularly: the user interface 48 receives commands from a user; a user interface signal transfers the said commands to the processing subsystem 50 as an input. The commands may, for example, be an instruction to execute a preparation process. The hardware of the user interface 48 may comprise any suitable device(s), for example, the hardware comprises one or more of the following: buttons, such as a joystick button or press button; joystick; LEDs; graphic or character LCDs; graphical screen with touch sensing and/or screen edge buttons.

Optional sensors 52 are operatively connected to the processing subsystem 50 to provide an input for monitoring said process. The sensors 52 typically comprise one or more of the following: fluid temperature sensors; fluid level sensors; position sensors e.g. for sensing a position of the extraction unit 26; flow rate and/or volume sensors.

The processing subsystem 50 (which may be referred to as a processor) is generally operable to: receive an input, i.e. said commands from the user interface 48 and/or from the sensors 52 and/or preparation information decoded by the code processing subsystem 18, as explained further below; process the input according to program code stored on a memory subsystem 112 (or programmed logic); provide an output, which is generally the said preparation process 116. The process may be executed with open-loop control, or more preferably with closed-loop control using the input signal from the sensors 52 as feedback. The processing subsystem 50 generally comprises memory, input and output system components, which are arranged as an integrated circuit, typically as a microprocessor or a microcontroller. The processing subsystem 50 may comprise other suitable integrated circuits, such as: an ASIC; a programmable logic device such as an FPGA; an analogue integrated circuit such as a controller. The processing subsystem 50 may also comprise one or more of the aforementioned integrated circuits, i.e. multiple processors.

The processing subsystem 50 generally comprises or is in communication with a memory subsystem 112 (which may be referred to as a memory unit) for storage of the program code and optionally data. The memory subsystem 112 typically comprises: a non-volatile memory e.g. EPROM, EEPROM or Flash for program code and operating parameter storage; volatile memory (RAM) for data storage. The program code typically comprises a preparation program executable to effect a preparation process 116. The memory subsystem may comprise separate and/or integrated (e.g. on a die of the processor) memory.

The power supply 54 is operable to supply electrical energy to the processing subsystem 50, container processing subsystem 14, and the fluid supply 12 as will be discussed. The power supply 54 may comprise various means, such as a battery or a unit to receive and condition a mains electrical supply.

The communication interface 56 is for data communication between the preparation machine 4 and another device/system, typically a server system. The communication interface 56 can be used to supply and/or receive information related to the preparation process, such as container consumption information and/or preparation process information. The communication interface 56 can be configured for cabled media or wireless media or a combination thereof, e.g.: a wired connection, such as RS-232, USB, I²C, Ethernet defined by IEEE 802.3; a wireless connection, such as wireless LAN (e.g. IEEE 802.11) or near field communication (NFC) or a cellular system such as GPRS or GSM. The communication interface 56 is operatively connected to the processing subsystem 50. Generally the communication interface comprises a separate processing unit (examples of which are provided above) to control communication hardware (e.g. an antenna) to interface with the master processing subsystem 50. However, less complex configurations can be used e.g. a simple wired connection for serial communication directly with the processing subsystem 50.

Code Processing Subsystem

The code processing subsystem 18 is operable: to obtain an image of a code on the container 6 or on an attachment to the container 6 or to the machine; to process said image to decode the encoded information including for example preparation information. The code processing subsystem 18 comprises an: image capturing device 106; image processing device 92; output device 114, which are described sequentially.

The image capturing device 106 is operable to capture a digital image of the code and to transfer said image, as digital data, to the image processing device 92. The image capturing device 106 is for example an infrared image capturing device, wherein the captured digital image is typically a black and white image representative of the contrasts in the infrared wavelength range. For example, the elements of the code are printed on the container with an ink comprising carbon black pigments that absorb infrared light, while the background surface around them reflects it. The captured black and white digital image will thus show the elements of the code as black or dark grey elements on a lighter background, for example white or light grey. To enable the scale of the digital image to be determined: the image capturing device 106 may be arranged a predetermined distance away from the code when obtaining the digital image; in an example wherein the image capturing device 106 comprises a lens the magnification of the lens is preferably stored on a memory of the image processing device 92. The image capturing device 106 comprises any suitable optical device for capturing a digital image consisting of the latter discussed micro-unit code composition. The code forming a micro-unit composition, the image capturing device may have very small dimensions, for example in the magnitude of a few millimetres or less, for example less than 2 mm in length, width and thickness, thereby facilitating its integration in a foodstuff/beverage preparation machine 4, for example in the container processing subsystem 14. Such image capturing devices are furthermore mechanically simple and reliable pieces of equipment that will not impair the machine's overall functional reliability. Examples of suitable reliable optical devices are: Son ix SN9S102; Snap Sensor S2 imager; an oversampled binary image sensor.

The image processing device 92 is operatively connected to the image capturing device 106 and is operable to process said digital data to decode information, in particular preparation information encoded therein. Processing of the digital data is discussed in the following. The image processing device 92 may comprise a processor such as a microcontroller or an ASIC. It may alternatively comprise the aforesaid processing subsystem 50, in such an embodiment it will be appreciated that the output device is integrated in the processing subsystem 50. For the said processing the image processing device 92 typically comprises a code processing program. An example of a suitable image processing device is the Texas Instruments TMS320C5517.

The output device 114 is operatively connected to the image processing device 92 and is operable to output digital data that comprises the decoded preparation information to the processing subsystem 50, e.g. by means of a serial interface.

Container

The container 6 may comprise, depending on the embodiment of the container processing subsystem, a: receptacle comprising material for preparation and end-user consumption therefrom; a capsule, pod or packet comprising material for preparation therefrom. The container 6 may be formed from various materials, such as for example metal, plastic, paper or a combination thereof. In general the material is selected such that it is: food-safe; it can withstand the pressure and/or temperature of the preparation process. Suitable examples of containers are provided following.

The container 6 when not in packet form generally comprises: a body portion 58 defining a cavity for the storage of a dosage of a material; a lid portion 60 for closing the cavity; a flange portion 62 for connection of the body portion and lid portion, the flange portion generally being arranged distal a base of the cavity. The body portion may comprise various shapes, such as a disk, frusto-conical or rectangular cross-sectioned. Accordingly, it will be appreciated that the capsule 6 may take various forms, an example of which is provided in FIG. 3A, which may generically extend to a receptacle or capsule as defined herein. The container 6 may be distinguished as a receptacle for end-user consumption therefrom when configured for example with an internal volume of 150-350 ml and preferably a diameter of 6-10 cm and axial length of 4-8 cm. In a similar fashion a capsule for extraction may be distinguished for example when configured with an internal volume of less than 100 or 50 ml and preferably a diameter of 2-5 cm and axial length of 2-4 cm. The container 6 in collapsible configuration may comprise an internal volume of 5 ml-250 ml. In embodiments, the container's cavity may be divided in a plurality of compartments, for example two, three or more compartments, each compartment containing a material possibly different from the material contained in the other compartments. The different materials of the various compartments may for example be processed simultaneously or sequentially by the container processing subsystem 14. Examples of such containers and their processing by an appropriate container processing subsystem are for example described in WO 2007/054479 A1, WO 2014/057094 A1 and unpublished application EP 17151656.0, which are all incorporated herein by reference.

Figure 3A:
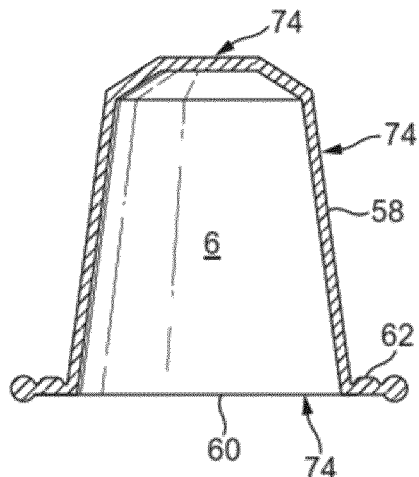
FIG. 3A is a cut view of an exemplary container according to the invention.
Figure 3B:
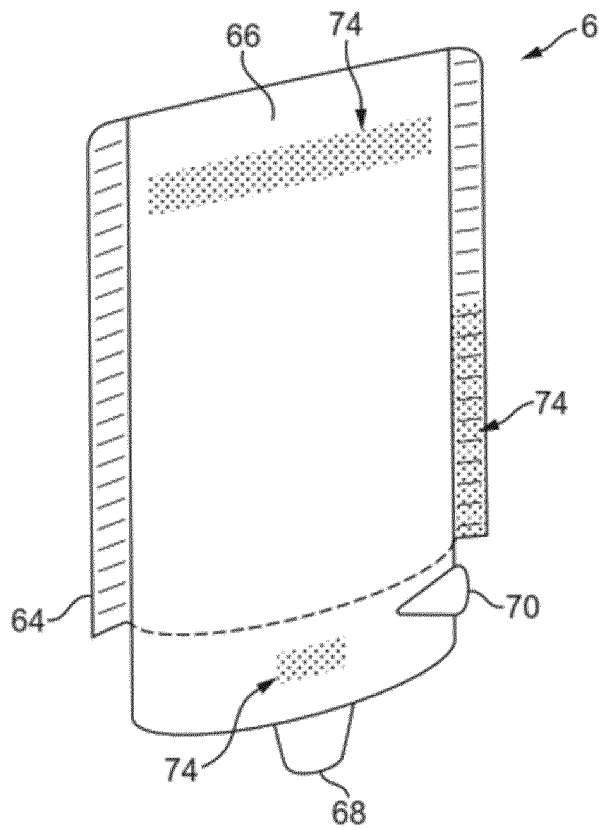
FIG. 3B shows another example of a container according to the invention.

The container 6 when in packet form, an example of which is provided in FIG. 3B, for example comprises: an arrangement of sheet material 64 (such as one or more sheets joined at their periphery) defining an internal volume 66 for the storage of a dosage of a material; an inlet 68 for inflow of fluid into the internal volume 66; an outlet 70 for outflow of fluid and material from the internal volume. In embodiments, the inlet and/or the outlet may be closed and the inlet 68 and outlet 70 are for example arranged on a body of an attachment (not shown), which is attached to the sheet material. The sheet material may be formed from various materials, such as for example, but not exclusively, metal foil, plastic, paper or a combination thereof. The internal volume 66 may for example be 150-350 ml or 200-300 ml or 50-150 ml depending on the application. In embodiments, the internal volume of the container may be divided in a plurality of compartments, for example two or three compartments, each compartment containing a material possibly different from the material contained in the other compartments. The different material of the various compartments may for example be processed simultaneously or sequentially by an appropriate container processing subsystem.

Other types of containers are however possible within the frame of the invention, the volume, shape, material and/or configuration of the containers being adapted to the nature and configuration of the container processing subsystem.

Information Encoded by Code

A code 74 of the container 6 encodes preparation information, which generally comprises information related to the associated preparation process. Depending of the embodiment of the container processing subsystem, said preparation information may comprise values of one or more preparation parameters, which may comprise one of more of a: fluid pressure; fluid temperature (at container inlet and/or outlet to receptacle); fluid mass/volumetric flow rate; fluid volume; oven temperature; stove temperature; extrusion parameters; mixing speed; phase identifier, for when a preparation process is split into a series of phase, whereby each phase comprises a set of one or more of the aforesaid parameters (there may be for example 2-10 phases); phase duration (e.g. a duration for applying the parameter values of a phase); recipe and/or container and/or compartment identifier, for when a recipe requires processing material contained in two or more containers and/or container compartments; container geometric parameters, such as shape/volume/number of ingredient compartments; other container parameters e.g. a container identifier, which may be used to monitor container consumption for the purpose of container re-ordering, an expiry date, a recipe identifier, which may be used to look-up a recipe stored on the memory of the beverage machine for use with the container.

Specifically in respect of a preparation machine 4 such as the one illustrated in FIG. 1A said parameters whose values are encoded may comprise any one or more of a: fluid pressure; fluid temperature; fluid volume; fluid flow rate; time of a particular phase of preparation for which the aforesaid one or more parameter values are applied for; phase identifier, e.g. an alphanumeric identifier, to identify which of a plurality of phases the aforesaid one or more parameter values relate; recipe identifier; pre-wetting time, which is the amount of time the material of the container may be soaked for during an initial preparation phase; pre-wetting volume, which is the amount of fluid volume applied during said phase.

Specifically in respect of a preparation machine 4 such as the one illustrated in FIG. 1B said parameters whose values are encoded may comprise one or more of a: percentage cooling or heating power to apply (e.g. the power applied by the thermal exchanger 44); torque applied by the agitator unit 40; one or more angular velocities (e.g. a gyration and radial angular velocities); container temperature (e.g. the temperature set by the thermal exchanger 44); time of a particular phase of preparation for which the aforesaid one or more parameter values are applied for; phase identifier, e.g. an alphanumeric identifier, to identify which of a plurality of phases the aforesaid one or more parameter values relate.

According to the invention, the encoded preparation information comprises a sequence of operations to be performed by the container processing subsystem of the beverage/foodstuff preparation machine in order to achieve the desired result with the material contained in the container 6, the nature of the operations of the sequence and the conditions for their performance being encoded as explained further below.

Arrangement of Code

The code 74 is arranged on an exterior surface of the container 6 in any suitable position such that it can be processed by the code processing subsystem 18. In the afore-discussed example of a receptacle/capsule 6, as shown in FIG. 3A, the code can be arranged on any exterior surface thereof, e.g. the lid, body and/or flange portion. In the afore-discussed example of a packet 6, as shown in FIG. 3B, the code can be arranged on any exterior surface thereof, e.g. either or both sides of the packet, including the rim.

A plurality of codes 74 can be formed on the container 6, e.g.: for read error checking; and/or for encoding parameter values related to separate phases of a preparation process, the parameter values for each phase being encoded by each code or a series of codes. In particular the planform of the code (as will be discussed) may comprise an at least partially tessellating shape, e.g. a polygon such as an hexagon or a rectangle, for example a square, whereby the codes are formed on a container in an at least partially tessellating manner (e.g. a grid with adjacent columns aligned or with adjacent columns offset).

Composition of Code

Figure 4A:
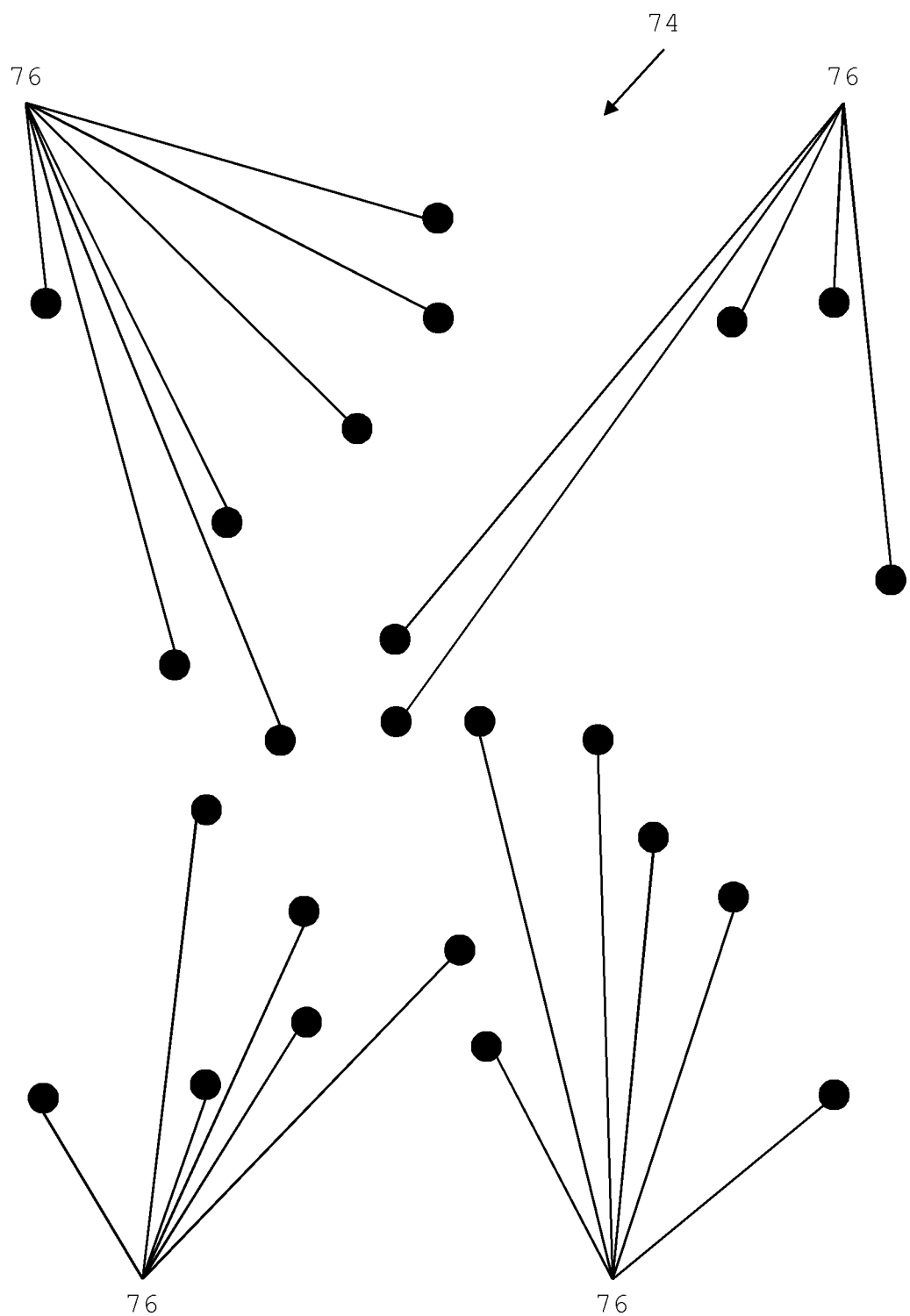
FIG. 4A shows an example of a code of a container according to the invention.

The code 74, an example of which is shown in FIG. 4A, is configured to encode preparation information in a manner for capturing by the image capturing device of the code processing subsystem of the beverage/foodstuff preparation machine of the invention. More particularly, the code 74 is formed of a plurality of units 76, preferably micro-units, with a surround of a different colour: typically the units 76 comprise a dark colour (e.g. one of the following: black, dark blue, purple, dark green) and the surround comprises a light colour (e.g. one of the following: white, light blue, yellow, light green) or the converse, such that there is sufficient contrast for the image processing device to distinguish therebetween. In the illustrated embodiment, the units 76 are for example dark coloured, typically black, circular dots on a light coloured, typically white, background. In embodiments, the units 76 are printed with an ink absorbing infrared light, for example an ink comprising carbon black pigments, while the surround preferably reflects infrared light. Alternatively or in combination with the above, the units 76 may be embossed in or punched through at least part of the container's surface material. In embodiments, the units 76 may have one or a combination of the following shapes: circular; triangular; polygonal, in particular a quadrilateral such as square or parallelogram; other known suitable shape. It will be appreciated that due to formation error, e.g. printing error, the aforesaid shape can be an approximation of the actual shape. The units 76 preferably have a unit length of 50-200 µm, e.g. 60, 80, 100, 120, 150 µm. The unit length is a suitably defined distance of the unit, e.g.: for a circular shape the diameter; for a square a side length; for a polygon a diameter or distance between opposing vertices; for a triangle a hypotenuse. The units 76 are preferably arranged with a precision of a few microns. The actual precision of the units' position on a finished container or on a finished attachment may however vary and will typically depend on various factors of the technology used for forming the code. These factors for example, but not exclusively, include: printer quality, precision of the embossing press, ink diffusion properties of the container's material, deformation of the container's surface after code formation, etc.

Whilst the code 74 is referred to as comprising a plurality of units 76 it will be appreciated that the units 76 may alternatively be referred to as elements 76 or markers 76.

Typically the units 76 are formed by: printing e.g. by means of an ink printer; embossing; engraving; other known means. As an example of printing the ink may be conventional printer ink and the substrate may be: polyethylene terephthalate (PET); aluminium coated with a lacquer, as found for example on Nespresso™ Classic™ capsules; paper, or other any suitable substrate. As an example of embossing the shape may be pressed by a stamp into a plastically deformable substrate, such as for example the aforesaid aluminium coated with a lacquer. The costs of forming the code on a container may thus be kept low by using conventional and inexpensive technologies, e.g. ink-jet, off-set, or laser printing, such that the costs of forming the code don't significantly impact the costs of production of the container.

Figure 4B:
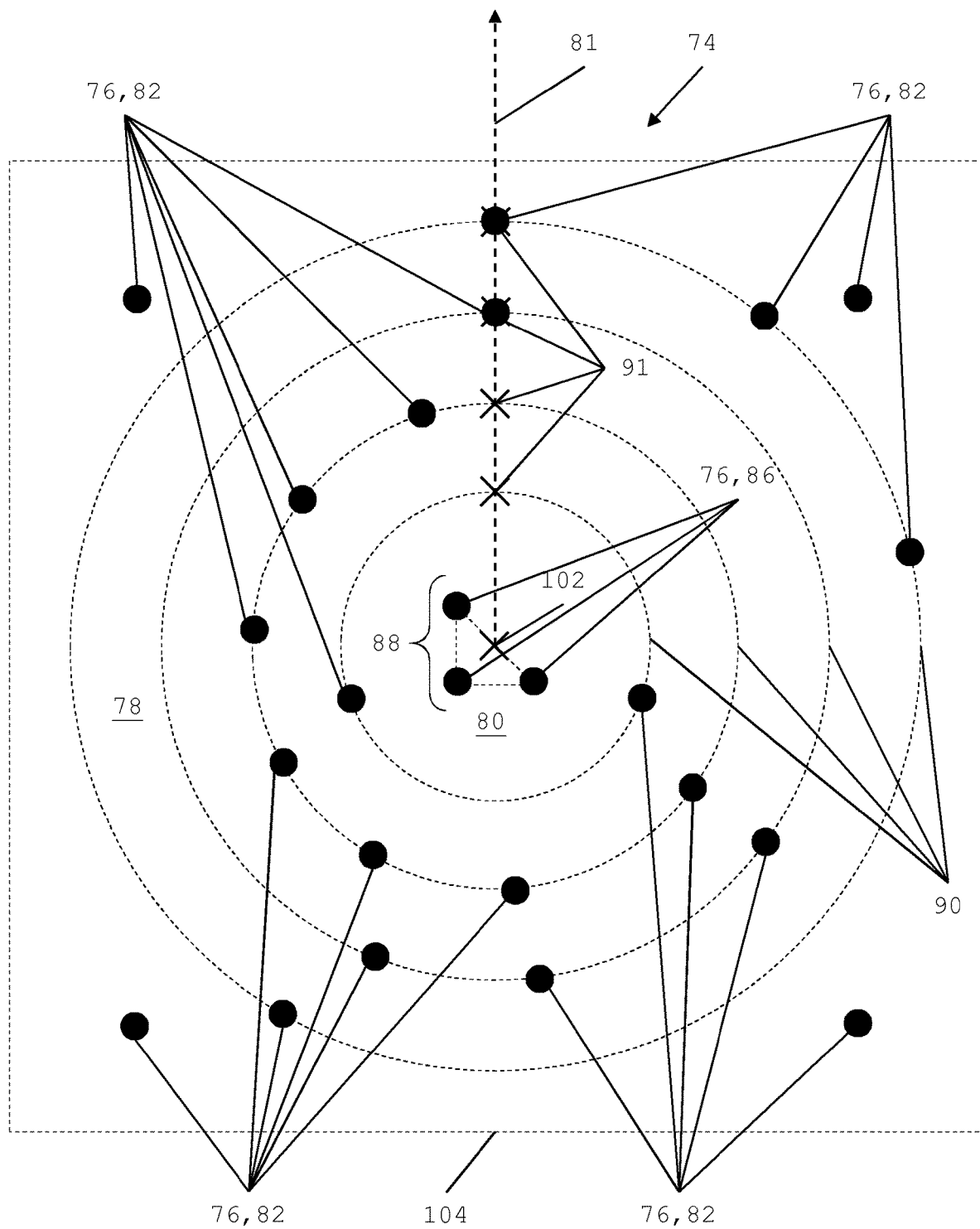
FIG. 4B shows the code of FIG. 4A with virtual elements of the code.

With reference to FIG. 4B, the code comprises a planform 104, within which the units 76 are arranged. The planform 104 is preferably virtual, i.e. it is preferably not formed, for example printed, on the container or on the attachment bearing the code. The planform 104 may be any appropriate shape such as elliptical, circular, polygonal, or rectangular. The planform may for example be square as shown in FIG. 4B. Typically the planform 104 has a length (e.g. a diameter for a circular or polygonal planform and a side length for a square planform) of 600-1600 µm, or about 1100 µm, which will depend on the amount of preparation information to be encoded.

The units 76 are organised into: data units 82 of a data portion 78 to encode preparation information; and reference units 86 of a reference portion 80 to provide a reference for the data portion 78, both of which are described in more detail following.

The reference portion 80 comprises a reference configuration 88, or reference image 88, defining a reference line 81. The reference line 81 is preferably virtual and provides a reference direction for angular reference by the data portion 78. In the illustrated embodiment, the reference configuration 88 for example comprises three reference units 86 arranged at the vertices of a virtual right-angled isosceles triangle, the middle of the triangle's hypotenuse defining a virtual reference point 102 from which the preferably virtual reference line 81 extends. The reference line 81 extends in a direction determined by the reference configuration 88, for example parallel to a leg of the "L" formed by the reference units 86, for example parallel to the upright leg of said "L", as illustrated in FIG. 4B.

The data portion 78 comprises a plurality of data units 82 encoding preparation information. At least part of said data units 82 are arranged along encoding lines 90 that each intersect the reference line 81 at a respective intersection point 91. The encoding lines 90 and the intersection points 91 are preferably virtual elements of the code 74, i.e. they are preferably not formed, for example not printed, on the container or the attachment bearing the code 74. The encoding lines are for example closed lines or parts thereof, for example elliptic, circular, square, rectangle, polygonal lines, or parts thereof. In the illustrated embodiment, the encoding lines 90 are for example concentric circular encoding lines 90 of different radii arranged with their centre coinciding with the reference point 102 of the reference portion 80, each encoding line 90 intersecting the reference line 81 at a different intersection point 91.

Optionally, further data units 82 are located within the planform 104 at positions that are defined relative to the reference configuration 88 and away from the encoding lines 90, as will be explained later.

Figure 4C:
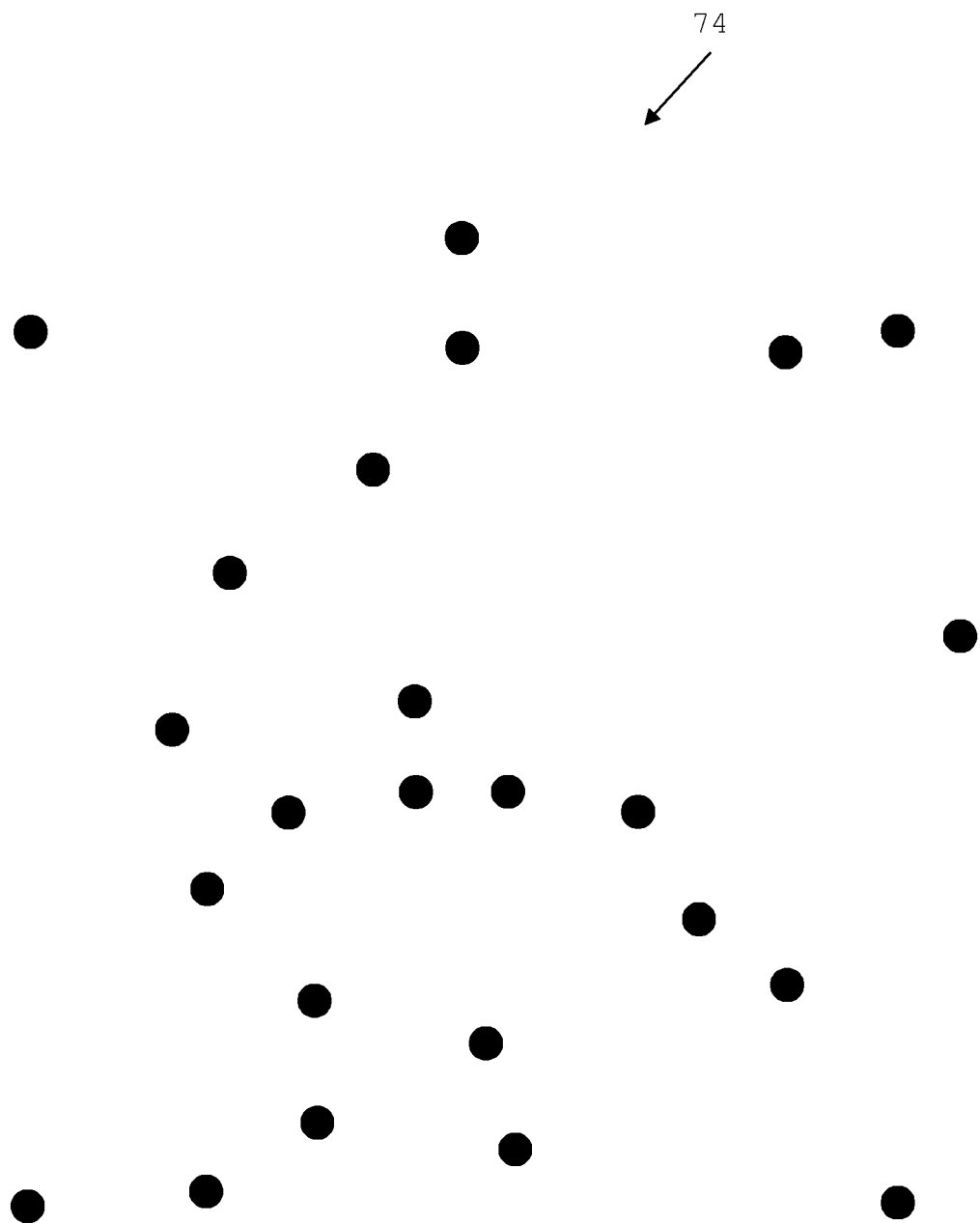
FIG. 4C shows the code of FIGS. 4A and 4B as it would appear when applied on a container according to a preferred embodiment of the invention.

The reference point 102, the reference line 81, the encoding lines 90, the intersection points 91 and the outline of the planform 104 are preferably virtual construction elements of the code 74, i.e. they are not formed on the container or the attachment bearing the code 74. Preferably, only the units 76 are formed, for example printed, on the respective container or attachment. FIG. 4C for example illustrates the code of FIGS. 4A and 4B as it preferably appears on the surface of a container or an attachment according to the invention.

Detailed Description of Code

Figure 5:
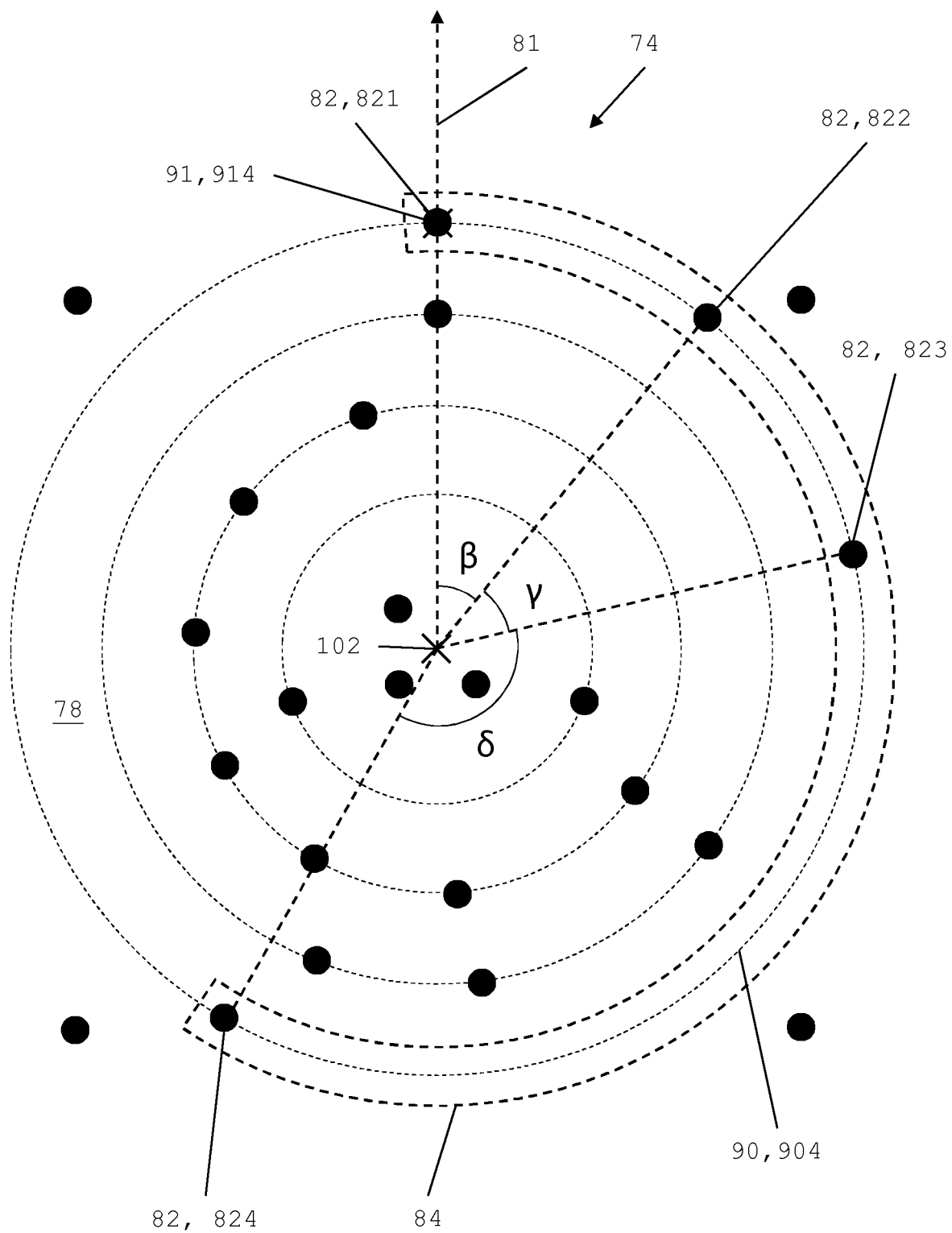
FIG. 5 illustrates the encoding of a sequence of operations with the code of FIG. 4A.

According to the invention and with reference to FIG. 5, the data portion 78 of the code 74 comprises a sequence of data units 84 comprising at least two data units 82 aligned at a distance from each other along an encoding line 90 of the data portion 78 for encoding a sequence of operations of the preparation information. In the illustrated embodiment, the sequence of data unit 84 for example comprises four data units 821, 822, 823, 824 aligned for example along the fourth and outermost circular encoding line 904 for encoding a sequence of four operations of the preparation information. The operations of the encoded sequence are typically operations to be performed in a specific order by the beverage or foodstuff preparation machine of the invention when processing the material contained in the container bearing the code 74 or an attachment bearing the code 74, in order to obtain the desired beverage or foodstuff. The operations may for example include opening and/or closing an outlet or an inlet of and/or in fluid connection with the container, starting and/or stopping the injection of a liquid, for example water or milk, in the container, starting and/or stopping a mixing arrangement of the container processing subsystem, starting and/or stopping a baking phase, etc., or any combination thereof, depending for example on the functionalities of the container processing subsystem, on the type of container and/or on the material contained therein, on the desired resulting beverage or foodstuff, etc. The series of operations of an encoded sequence for example consists of successive starting and stopping of a pump, successive opening and closing of an outlet of or in fluid connection with the container, successive starting and stopping of a mixing arrangement, successive starting and stopping of an oven, etc., or any predefined series of operations of different types to be performed in a specific order.

According to the invention, each data unit 82 of the sequence of data units 84 encodes an operation of the encoded sequence of operations, i.e. each data unit 82 of the sequence of data units 84 corresponds to an operation of the corresponding sequence of operations. The series of operations of the encoded sequence of operations is preferably predefined and typically known to the control subsystem and/or to the code processing subsystem of the beverage/foodstuff preparation machine. The series of operations depends for example on the encoding line along which the sequence is encoded.

In embodiments, the series of operation encoded by a sequence of data units 84 on a particular encoding line 90 may be one of a plurality of predefined series of operations known to the beverage preparation machine, and the actually encoded series is for example determined by the value of a further corresponding parameter of the encoded preparation information, for example by a parameter encoded on one or more discrete positions of the code, as will be explained later. Depending on the value of said parameter, a sequence of data units along a particular encoding line of the code thus either encode for example a series of opening and closing operations of an outlet of or in fluid connection with the container, or a series of starting and stopping operations of a pump for injecting a liquid in the container.

The nature of the operation encoded by a particular data unit 821, 822, 823 or 824 of the sequence of data units 84 is encoded by the relative position of this particular data unit in the sequence of data units 84. Typically, the first data unit 82 of the sequence of data units 84 encodes the first operation of the series of operations of the encoded sequence of operations, the second data unit 82 of the sequence of data units 84 encodes the second operation of the series of operations of the encoded sequence of operations, etc., up to the last data unit 82 of the sequence of data units 84. Other correspondences between the operations and the relative positions of the data units 82 of the sequence of data units 84 may however be defined within the frame of the invention. In the illustrated embodiment, the sequence of data units 84 along the fourth encoding line 904 is defined to encode a series of successive opening and closing of the outlet of the respective container by the processing subsystem of the beverage preparation machine during processing of the container. The sequence of data units 84 comprising four data units 82, it encodes a sequence of four operations: two operations of opening the outlet and two operations of closing the outlet. The first data unit 821 along the fourth encoding line 904, for example in a clockwise direction from the corresponding intersection point 914, encodes an operation of opening the outlet, while the second data unit 822 encodes an operation of closing the outlet, etc.

According to the invention, the distance between a particular data unit 82 of a sequence of data unit 84 and the corresponding intersection point 91 and/or the distance between this particular data unit 82 and an adjacent data unit 82 encodes a value of a condition for the performance of the operation encoded by this particular data unit 82. The distance between two data units 82 or between a data unit 82 and an intersection point 91 may be expressed as a linear distance, a distance along the corresponding encoding line 90, for example the length of an arc, or an angular distance measured from a given point, for example from a centre point of the encoding line 90 and/or from a virtual reference point 102 of the code 74. The correspondence between the measured distance and the encoded value is defined by a correspondence function known to the code processing subsystem and/or to the control subsystem of the preparation machine. The function may be linear, exponential, or any appropriate correspondence function. An exponential function is for example advantageous in order to allow a higher precision when encoding small values than when encoding large values.

For example, the distance between the first data unit 821 of a sequence of data units 84 and the corresponding intersection point 91 encodes a value of a condition for the performance of the first operation of the encoded sequence of operations. The distance between the second data unit 822 and the first data unit 821 encodes a value of a condition for the performance of the second operation. The distance between the third data unit 823 and the second data unit 822 encodes a value of a condition for the performance of the third operation. The distance between the fourth data unit 824 and the third data unit 823 encodes a value of a condition for the performance of the fourth operation. And so on up to the last operation of the encoded sequence of operations.

The nature of the condition for the performance of a particular operation for example depends on the nature of the operation, and is preferably predefined, for example known to the container processing subsystem and/or to the control unit of the beverage/foodstuff preparation machine. The nature of the condition may for example be one of a time duration, a volume of liquid to be injected, a volume of beverage or foodstuff to be dispensed, a consistency or a temperature to be reached by the preparation, etc. Accordingly, the measured distance may for example encode a number of seconds or minutes, a number of millilitres, a value of a current intensity for driving a mixing equipment, a number of degrees Celsius, etc.

In the illustrated example where the sequence of data units 84 encodes a series of successive operations of opening and closing an outlet of and/or in fluid connection with a container;

the distance between the first data unit 821 and the respective intersection point 914 for example encodes a value in seconds of a time duration that the preparation machine must wait from the start of the processing of the container before opening the outlet;

the distance between the second data unit 822 and the first data unit 821 encodes a number of seconds of a time duration that the preparation machine must allow to lapse before closing the outlet after the first operation of opening;

the distance between the third data unit 823 and the second data unit 822 encodes a number of seconds of a time duration that the preparation machine must wait before the outlet is opened again after the first operation of closing the outlet;

and the distance between the fourth and last data unit 824 and the third data unit 823 encodes a number of seconds of a time duration before the outlet is to be closed again from the second operation of opening the outlet.

In order to allow a reliable decoding of the code 74, and with reference to FIG. 4B, the code processing subsystem must be able to reliably distinguish the reference portion 80 from the data portion 78 of the code 74. The reference configuration 88 must thus be unique within the code 74. In embodiments such as the one illustrated in the figures where the reference configuration 88 is made of reference units 86 similar or identical to the data units 82, data units 82 must be prevented to form a configuration identical or close to the reference configuration 88 when encoding preparation information. In particular, the distance between two adjacent data units 82 may not be equal to a distinctive distance between two reference units 86 of the reference portion 80. In the illustrated example, the distance between two adjacent data units 82 should thus not be equal to the length of a leg of the right-angled triangle formed by the reference units 86. Preferably, a minimal distance is thus chosen which must be kept between two adjacent data units 82 when forming the code 74 on a container or on an attachment, the minimal distance being noticeably larger for the code processing subsystem of the preparation machine than the distinctive distance of the reference configuration 88. The difference between the minimal distance and the distinctive distance of the reference configuration 88 may depend on various factors such as, for example, the characteristics of the code processing subsystem and its elements, for example on the maximal resolution of the image processing device, on the printing accuracy, etc. If the distance between two adjacent units 76 is smaller than this minimal distance, there is a risk that the code processing subsystem will not distinguish the reference configuration 88, thereby leading to decoding errors. The minimal distance between two adjacent data units 82 is thus preferably not used for encoding a value in a sequence of data units 84 according to the invention. The minimal distance is thus subtracted from a measured distance, when applicable, before applying the correspondence function to convert said distance into an encoded value.

EXAMPLE 1

In this illustrative but in no way limiting example, and with reference to FIG. 5, the code 74 comprises a sequence 84 of four data units 821, 822, 823 and 824 aligned at a distance from each other along a virtual encoding line 90, for example along the fourth and outermost virtual encoding line 904 of the four concentric circular virtual encoding lines of the code 74. The centre of the fourth encoding line 904 coincides with the virtual reference point 102 from which the reference line extends. The fourth encoding line intersects the virtual reference line 81 at a virtual intersection point 914. The sequence of data units 84 for example encodes a sequence of operations consisting of a series of successive openings and closings of an outlet of or in fluid connection with a container on which the code 74 is to be formed. The sequence of data units 84 thus encodes a first operation of opening the outlet, followed by a closing of the outlet, then a second opening of the outlet and finally a second and last closing of the outlet. The condition for the performance of these operations is a time duration from the start of the processing or from the previous operation, where applicable. The value of the time duration is encoded by the distances between the first data unit 821 and the intersection 91 for the first operation, and by the distance between the data unit and the previous data unit of the sequence 84 for the second, third and fourth operations, as will be explained more in details further below.

When formed, for example printed, the units of the code 74 are circular dots with a diameter of 60 μm. The minimal linear distance between two data units 82 in order to avoid confusion between the data portion and the reference portion of the code 74 is for example 250 μm. The fourth encoding line 904 having a radius of 615 μm, the minimal linear distance of 250 μm corresponds to a minimal angular distance of:

$$\alpha_{min} = 2 \cdot \arcsin\left(\frac{d_{min}/2}{r}\right) = 2 \cdot \arcsin\left(\frac{250/2}{615}\right) = 23.45°, \quad (1)$$

where $\alpha_{min}$ is the minimal angular distance, $d_{min}$ is the minimal linear distance and r is the radius of the encoding line. For the sake of simplicity, the minimal angular distance between two data units 82 of the sequence of data units 84 along the fourth encoding line 904 was set to 30°.

The first data unit 821 of the sequence of data units 84, which encodes a first opening of the outlet of or in fluid connection with a container of the invention, is placed at a first distance of 0° from the corresponding intersection point 914. The encoded value is thus zero seconds, which means that the outlet is opened by the container processing subsystem upon starting the processing of the container, or of the material therein.

The second data unit 822, which encodes the second operation of the sequence, which is the closing of the outlet, is placed at a second distance β of 33° from the first data unit 821. The distance encoding the value of the time duration for the performance of the second operation, i.e. closing the outlet, from the performance of the first operation is thus 33°−30°=3°. The correspondence function is for example x degrees=x seconds. The encoded value is thus 3 seconds.

The third distance y between the third data unit 823 and the second data unit 822 is for example 34°. The distance encoding the value of the time duration for the performance of the third operation, i.e. opening the outlet again, from the performance of the second operation is thus 34°−30°=4°, thus corresponding to an encoded value of 4 seconds.

The fourth distance δ between the fourth data unit 824 and the third data unit 823 is for example 210°. The distance encoding the value of the time duration for the performance of the fourth operation, i.e. closing the outlet, from the performance of the third operation is thus 210°−30°=180°, thus corresponding to an encoded value of 180 seconds.

According to this example, the sequence of data units 84 on the fourth encoding line thus encodes the following sequence of operations: the outlet is opened as soon as the processing of the container and the material contained therein is started. The outlet is closed 3 seconds later, and opened again 4 seconds after having been closed. Finally, the outlet is closed after 180 seconds from the last opening, and remains closed until the end of the processing. Other parameters of the preparation information, such as for example a temperature of a carrier liquid, volume of injected carrier liquid, volume of extracted, or dispensed, beverage or foodstuff, pump parameters determining the pressure of the injected carrier liquid, etc. are for example encoded by at least part of the remaining data units of the code 74, which are preferably located on other encoding lines.

Figure 6A:
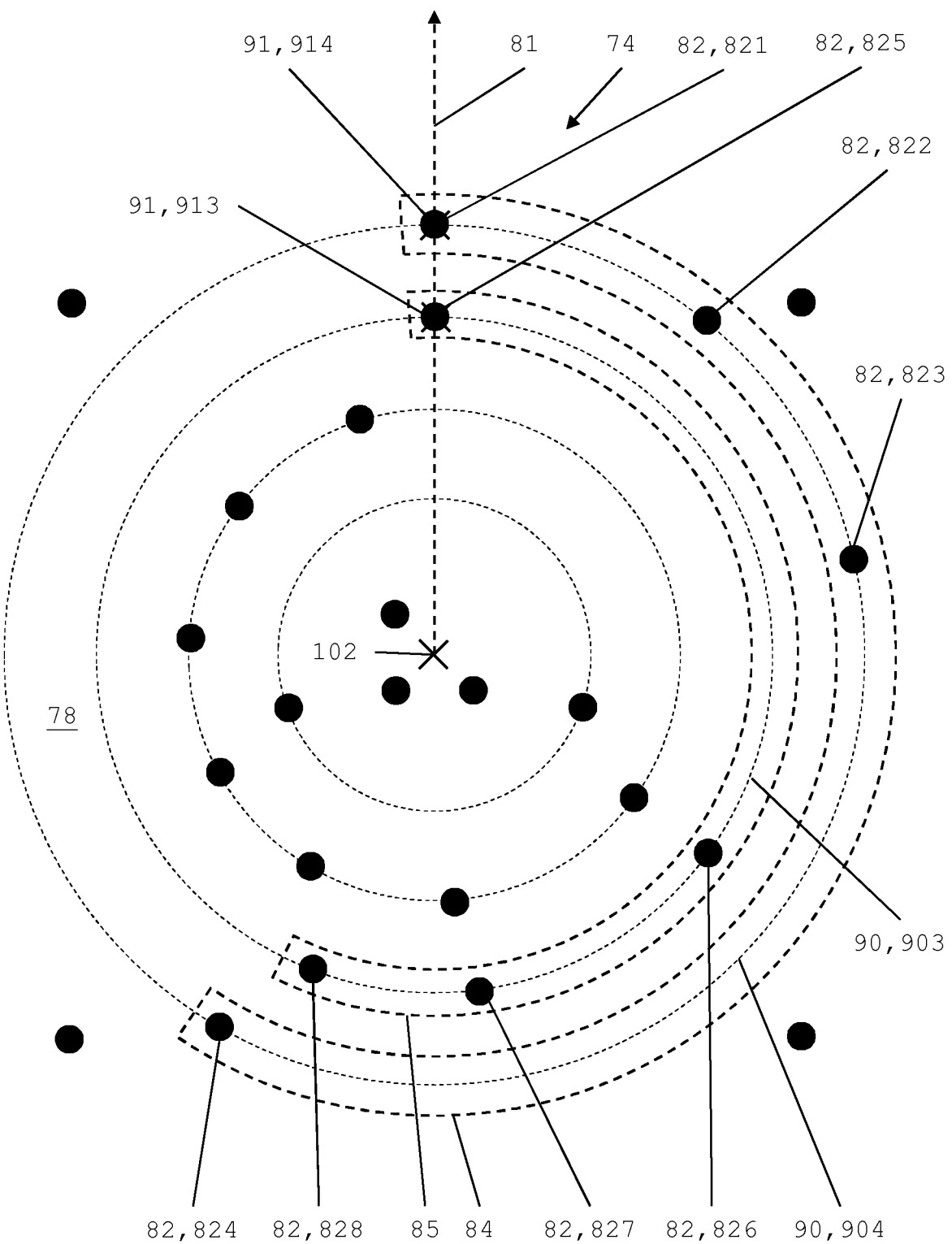
FIGS. 6A illustrates the encoding of two sequences of operations with the code of FIG. 4A.

In embodiments, and with reference to FIG. 6A showing an illustrative but in no way limiting example thereof, the code may comprise two or more sequences of data units 84, 85, each sequence of data units 84, 85 encoding a respective sequence of operations of the preparation information as described above. Each sequence of data units 84, 85 is for example formed along another encoding line 904, 903 of the code 74. In embodiments, the encoded sequences of operations are sequences of operations that have to be performed sequentially, i.e. one after the other, in which case the intersection point of the encoding line along which the second sequence of operations to be performed is encoded may for example correspond to the end of the first sequence of operations. In embodiments, the encoded sequences of operations have to be performed concurrently. The two or more sequences are for example performed independently from each other, i.e. the correspondingly encoded sequences of operations are performed concurrently but the performance of a next operation of a sequence of operations only depends on the performance of the previous operation of the same sequence. In such case, the distances encoding the values of the conditions for the performance of the encoded operations are typically distances between data units and/or between data units and the intersection point of a same sequence, as explained for example in relation to Example 1 above for a single sequence of data units. Alternatively, or in combination thereof, two or more sequences may have to be performed interdependently from each other, i.e. the performance of at least one operation of a first sequence of operations depends on the performance of an operation of a second sequence of operations. In such case, the distance encoding the value of the condition for the performance of this at least one operation of the first sequence of operations is typically a distance between the data unit of a first sequence of data units that encodes this at least one operation and a data unit of the second sequence of data units, typically the data unit encoding the corresponding operation of the second sequence of operations. This will be explained more in details in Example 2 below.

EXAMPLE 2

With reference to FIG. 6A, the code 74 comprises for example a first sequence of data units 84 along the fourth and outermost virtual encoding line 904 and a second sequence of data units 85 along the third virtual encoding line 903. The third and fourth encoding lines 903, 904 each intersect the virtual reference line 81 at a respective intersection point 913, 914. In the illustrated example, each of the first and second sequences of data units 84, 85 comprises four data units 82 for encoding four operations. The first sequence of operations encoded by the first sequence of data units 84 is for example a series of operations of opening and closing an outlet of or in fluid connection with a container of the invention bearing the code 74, while the second sequence of operations encoded by the second sequence of data units 85 is a series of operations of starting and stopping a pump of the preparation machine processing the container for starting and stopping the injection of liquid, for example water or milk, in the container. The first and the second sequences of operations are for example to be performed concurrently in order to achieve the desired result, i.e. liquid is injected in the container at some defined intervals and in some defined volumes while the outlet is opened and closed in a defined sequence that depends on the injected volumes and/or on the volumes of beverage or foodstuff extracted from the container, in order to optimize for example dilution of the material contained in the container and/or conditioning of the mixture at the outlet through pressure inside the container. The operations of the first and second sequences of operations therefore have to be performed in a specific order and at specific conditions that may depend upon the performance of operations of the other sequence.

The operations of the concurrent sequences of operations are performed in an order determined by the relative angular distance to the respective intersection point 914, 913 of the respective encoding data units 82. In the illustrated example, the first operation of the first sequence of operation and the first sequence of the second sequence of operations, encoded respectively by the first data unit 821 of the first sequence of data units 84 and by the first data unit 825 of the second sequence of data units 85, are to be performed simultaneously at the beginning of the container processing, the angular distance of the first data units 821, 825 of each sequence of data units 84, 85 being at an angular distance of 0° from the respective intersection point 914, 913, encoding for example a time duration value of 0 seconds. The first and second sequences of data units 84, 85 thus encode simultaneous operations of starting the injection of liquid in the container and opening of the outlet.

Reading the first and second sequences of operations 84, 85 for example in a clockwise direction, the next operation to be performed is the second operation of the first sequence of operation, encoded by the second data unit 822 of the first sequence of data units 84, which is located at an angular distance of 33° from the respective intersection point 914 and/or from the previous data units 821, 825.

As explained above, a minimal distance has to be kept between two adjacent data units 82 on a same encoding line in order to avoid confusion with reference units of the reference configuration. The minimal linear distance between two data units 82 being for example 250 µm and the radius of the third encoding line being for example 495 µm, the minimal angular distance between two data units on the third encoding line may be calculated with formula (1) above to $\alpha_{min}=29.25°$. In the present example, out of simplicity, the minimal angular distance was thus set to 30° for the fourth and for the third encoding line 904, 903.

The encoding distance between the second data unit 822 and the first data unit 821 of the first sequence of data units 84 is thus 33°−30°=3°. Using the correspondence formula of example 1, this distance encodes a time duration value of 3 seconds between the simultaneous performances of the first operation of each sequence of operations and the performance of the second operation of the first sequence operation, i.e. a time duration of 3 seconds from the start of the sequences of operations before the outlet is closed again, while injection of liquid in the container continues.

The next operation to be performed by the container processing subsystem of the preparation machine of the invention is the third operation of the first sequence of operations, encoded by the third data unit 823 of the first sequence of data units 84, which is located at an angular distance of 34° from the previous data unit 82 of the first and second sequences of data units 84, 85, i.e. from the second data unit 822 of the first sequence of data units 84, or at a distance of 67° from the respective intersection point 914. The encoding distance between the third data unit 823 and the second data unit 822 of the first sequence of data units 84 is thus 34°−30°=67°−33°−30°=4°. Using the same correspondence formula as above, this distance encodes a time duration value of 4 seconds from the performance of the second operation of the first sequence of operations before the performance of the third operation of the first sequence operation, i.e. a time duration of 4 seconds from the operation of closing the outlet before opening it again. In the meantime, injection of liquid in the container continues.

The next operation to be performed is the second operation of the second sequence of operations, encoded by the second data unit 826 of the second sequence of data units 85, which is located at an angular distance of 182° from the first data unit 825 of the second sequence of data units 85, or at a distance of 182°−67°=115° of the data unit 82 encoding the previously performed operation, i.e. from the third data unit 823 of the first sequence of data units 84. In the present example, the condition for the performance of the second operation of the second sequence of operations, i.e. the operation of stopping the pump of the beverage preparation device, is for example defined as a volume of beverage or foodstuff to be extracted through the outlet since its last opening. Once the desired volume is dispensed, or extracted, the pumps is stopped, thereby stopping the injection of carrier liquid in the container. Since the condition for the performance of this operation of stopping the pump depends on the previous operation of opening the container's outlet, the encoding distance is for example defined to be the distance between the second data unit 826 of the second sequence of data units 85 and the third data unit 823 of the first sequence of data units 84. Since the distance is measured between data units 82 that are not on the same encoding line 90, keeping a minimal angular distance between them is not compulsory. The encoding distance may thus be the measured angular distance between them, i.e. 115°. Using for example a correspondence function x degrees=x millilitres, the encoded value is 115 ml. Hence the pump of the preparation machine of the invention is to be stopped, according to the present example, after 115 ml of beverage or foodstuff have been extracted from the container after its second opening.

The next operations to be performed by the preparation machine of the invention are the third and fourth operations of the second sequence of operations, encoded respectively by the third data unit 827 and by the fourth data unit 828 of the second sequence of data units 85, which are located respectively at angular distances of 216° and 271° from respective intersection point 913. The encoding distance between the third data unit 827 and the second data unit 826 of the second sequence of data units 85 is thus 216°–182°–30°=34°–30°=4°, encoding for example a time duration value of 4 seconds from the performance of the second operation of the second sequence of operations to the performance of the third operation of the second sequence of operations, i.e. a time duration of 4 seconds from the operation of stopping the preparation machine's pump for the first time and starting it again while the outlet is still open, for example in order to actively extract the mixture remaining in the container. The encoding distance between the fourth data unit 828 and the third data unit 827 of the second sequence of data units 85 is 271°–216°–30°=55°–30°=25°, encoding for example a extracted volume of 25 ml from the performance of the third operation of the second sequence of operations to the performance of the fourth and last operation of the second sequence of operations, i.e. an extracted volume of 25 ml from the operation of starting the preparation machine's pump for the second time and stopping it again while the outlet is still open.

Finally, the last operation to be performed according to the present example is the fourth operation of the first sequence of data units 84, encoded by the fourth data unit 824 of the first sequence of data units 84, which is located at an angular distance of 281° from the respective intersection point 914. In the present example, the condition for the performance of the fourth and last operation of the first sequence of operations, i.e. the operation of closing the outlet at the end of the processing in order to avoid undesired dripping, is for example defined as a time duration during which the outlet remains open after the pump has been stopped for the second time in order to allow as much as possible of the content of the container to be extracted before closing the outlet. Since the condition for the performance of this last operation of closing the outlet for the second time depends on the performance of the previous operation of stopping the pump, the encoding distance is for example defined to be the angular distance between the fourth data unit 824 of the first sequence of data units 84 and the data unit 82 encoding the last performed operation, i.e. the fourth data unit 828 of the second sequence of data units 85. Since the distance is measured between data units 82 that are not on the same encoding line 90, keeping a minimal angular distance between them is not compulsory. The encoding distance may thus be the measured angular distance between them, i.e. 281°–271°=10°, which encodes for example a time duration value of 10 seconds. Hence the outlet of the container will remain open 10 seconds after the pump of the preparation machine has been stopped in order to allow as much as possible of the mixture contained in the container to be extracted.

Other parameters of the preparation information, such as for example a temperature of a carrier liquid, pump parameters determining a pressure of the injected carrier liquid, etc. are for example encoded by at least part of the remaining data units of the code 74, which are preferably located on other encoding lines.

Figure 6B:
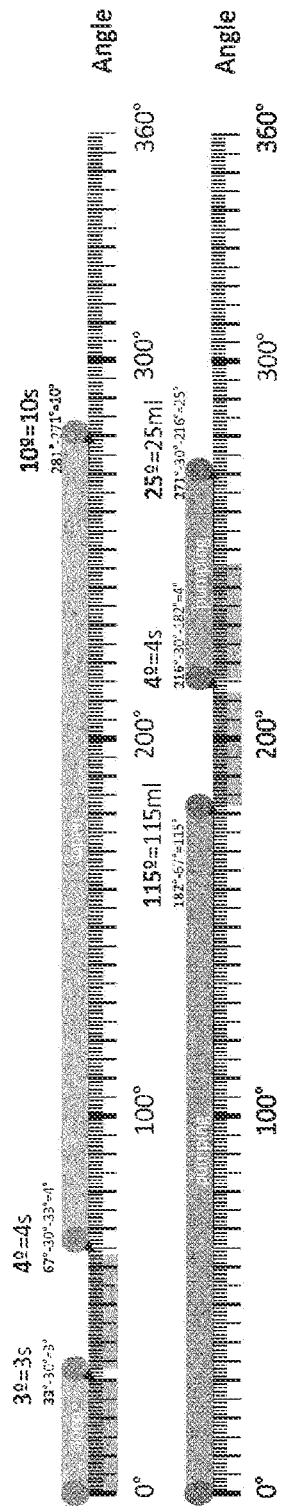
FIG. 6B is a linear representation of the sequences of FIG. 6A.

FIG. 6B illustrates the encoding of the first and second sequences of operations of Example 2 described above on a linear scale representing the angular distance to the respective intersection points.

The encoded concurrent sequences of operations may be summarized as follows:
at t=0 s: outlet is opened
at t=0 s: pumping is started
after 3 s: outlet is closed
after 7 s: outlet is opened
after 115 ml extraction: pumping is stopped
after wait time of 4 s: pumping is started
after 25 ml more extraction (140 ml in total): pumping is stopped
after wait time of 10 s: outlet is closed In the examples above the correspondence function is a linear function, wherein the encoded value is proportional to the encoding distance.

Other correspondence functions are however possible within the frame of the invention, such as exponential, logarithmic, step functions, etc. Exponential formulas are for example appropriate in order to obtain a higher precision at low values, where a precision is usually more important, than at higher value where precision is often less critical.

In embodiments, time and volume are for example decoded using the following exponential correspondence function:

$$x = f(\alpha) = x_{min} \cdot \left(\frac{x_{max}}{x_{min}}\right)^{\alpha/\alpha_{max}} \quad (2)$$

where x is the encoded value expressing for example, but not exclusively, a time duration, a volume, a voltage, a current intensity, a viscosity, a temperature, etc.; $x_{min}$ and $x_{max}$ are the lower and higher values respectively of the encoding range of value x, $\alpha$ is the encoding distance, for example an angular encoding distance, and $\alpha_{max}$ is the largest possible encoding distance for value x, for example the largest possible angular encoding distance.

When encoding preparation information, the inverse function is typically used to determine the encoding distance and thus the position of the corresponding data unit on the encoding line.

Figure 7:
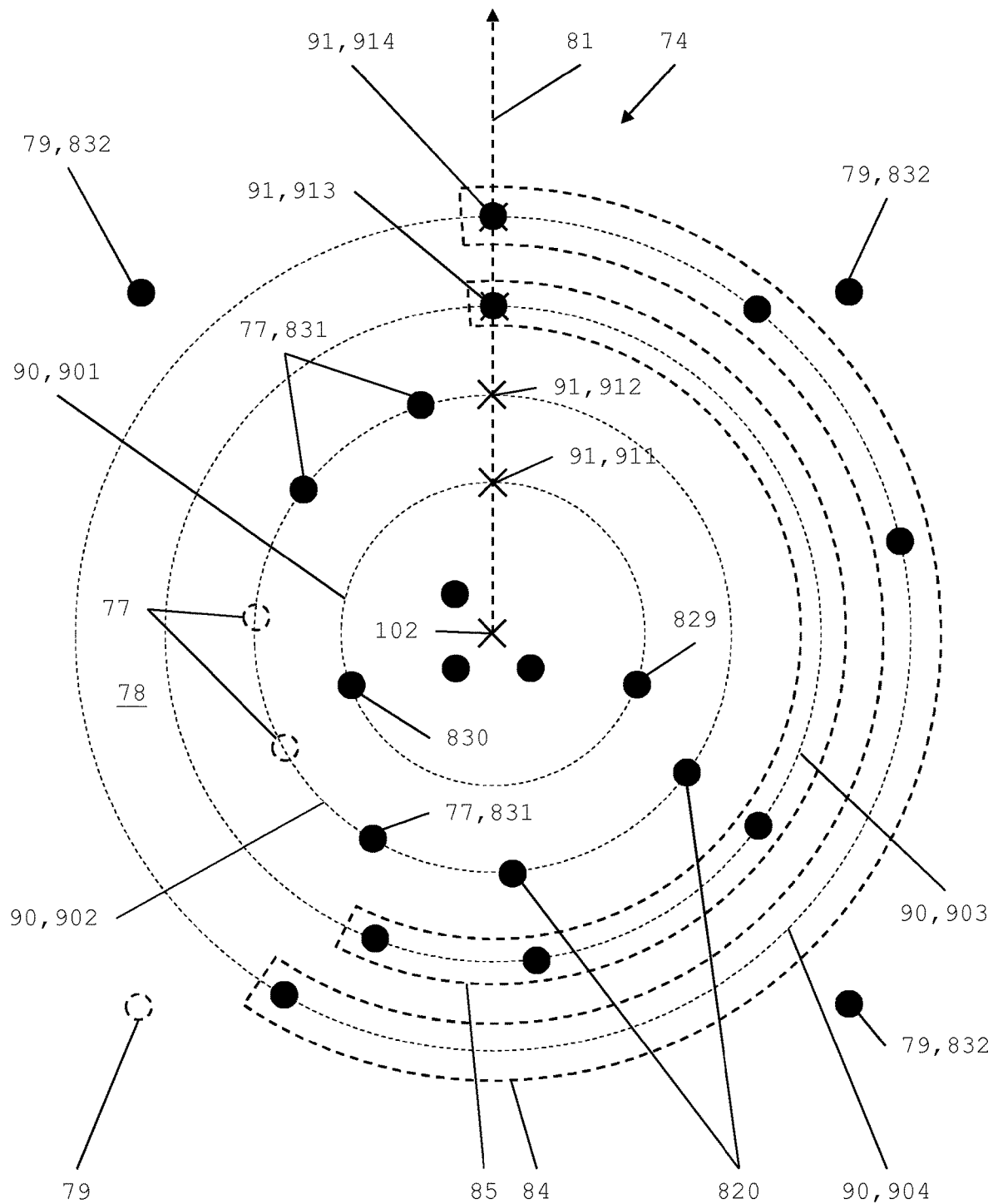
FIG. 7 illustrates the encoding of further preparation information with the code of FIG. 4A.

In embodiments, and with reference to FIG. 7, the code 74 of the invention comprises further data units for encoding further parameters of the preparation information other than sequences of operations, such as for example, but not exclusively, a temperature, pump setting parameters, etc.

The code 74 for example comprises a data unit 829 located along a virtual encoding line 91, for example the innermost encoding line 901 for encoding a value such as for example, but not exclusively, a temperature value, a pump cut-off pressure value, or the value of any other appropriate parameter of the preparation information. The data unit 829 may be positioned at any distance from the intersection point 911 of the corresponding encoding line 901 and the reference line 81, wherein the distance, for example measured as an angular distance, encodes the corresponding parameter value according to a predefined correspondence function.

In embodiments, two or more data units may be positioned along a same encoding line 90 to each encode another parameter value. In the illustrated embodiment, two data units 829, 830 are for example positioned along the innermost encoding line 901 to each encode another parameter value. The first data unit 829 for example encodes a first parameter value with its distance, for example its angular distance, from the corresponding intersection point 911 in a clockwise direction within a range of 0° to 180°, while the second data unit 830 encodes a second parameter value within a distance range of 180° to 360°. The ranges may furthermore be limited further in order to ensure a minimal distance between the first and second data units 829, 830 over the entire encoding range.

In embodiments, a pair of data units may be positioned along an encoding line to encode a parameter value. In the illustrated example, a pair of data units 820 is positioned along the second encoding line 902 at any distance from the corresponding intersection point 912, the distance, measured for example as an angular distance, encoding said parameter value according to a predefined correspondence function. The distance from the intersection point 912 to the pair of data units 820 may for example be calculated as the average distance to each data unit of the pair of data unit 820, thus corresponding to the distance to the middle point between the two data units of the pair of data units 820.

The data units of the pair of data units 820 are preferably separated from each other by a predefined set distance that allows for example the code processing subsystem of the preparation machine of the invention to accurately discriminate data units forming a pair of data units 820 from other data units on the same and/or other encoding lines.

In embodiments, the code 74 further comprises discrete positions 77, 79 that may or may not comprise a data unit 831, 832 to encode further preparation information in a binary manner, each discrete position 77, 79 for example corresponding to a bit of information, the presence of a data unit 831, 832 being for example interpreted as a "1" and the absence of a data unit being interpreted as a "0".

Discrete positions are for example located on available space along encoding lines 90, where the presence of a data unit 831 would not lead to decoding errors. In the illustrated embodiments, discrete positions 77 are for example positioned along the second virtual encoding line 902, along a segment of the encoding line 902 that is not used by the pair of data units 820. Five discrete positions 77 are for example positioned after the pair of data units 820 in a clockwise direction, and separated from each other and from the closest data unit of the pair of data units 820, by a distance different than the distance separating the two data units of the pair of data units 820, in order to avoid any possible confusion between the two data units of the pair of data units 820 and two discrete positions 77. Accordingly, the locations of the discrete positions 77 are determined after the location of the pair of data units has been determined, based on the parameter value to be encoded.

Other discrete positions 79 may be placed within the planform of the code 74, but away from the virtual encoding lines 90, for example, as in the illustrated embodiment, close to the corners of the code's square planform.

The discrete positions 77, 79 are preferably used to encode the values of one or more parameters that may only take discrete values. At least some discrete positions are for example used to encode which encoding scheme, among a limited discrete number of encoding schemes, was chosen to encode data in the particular code 74. These discrete positions thus provide information to the code processing subsystem on how to decode the other values encoded in the code 74. Other discrete positions may for example encode whether the beverage or foodstuff is cold or warm, thereby for example determining a value range for a data unit encoding a temperature value, etc.

In the illustrated embodiments, the encoding lines 90 are circular encoding lines. Other types of encoding lines are however possible within the frame of the invention, such as for example, but not exclusively, straight linear encoding lines, arc shaped encoding lines, polygonal encoding lines, rectangle encoding lines, elliptic encoding lines, etc.

Figure 8A:
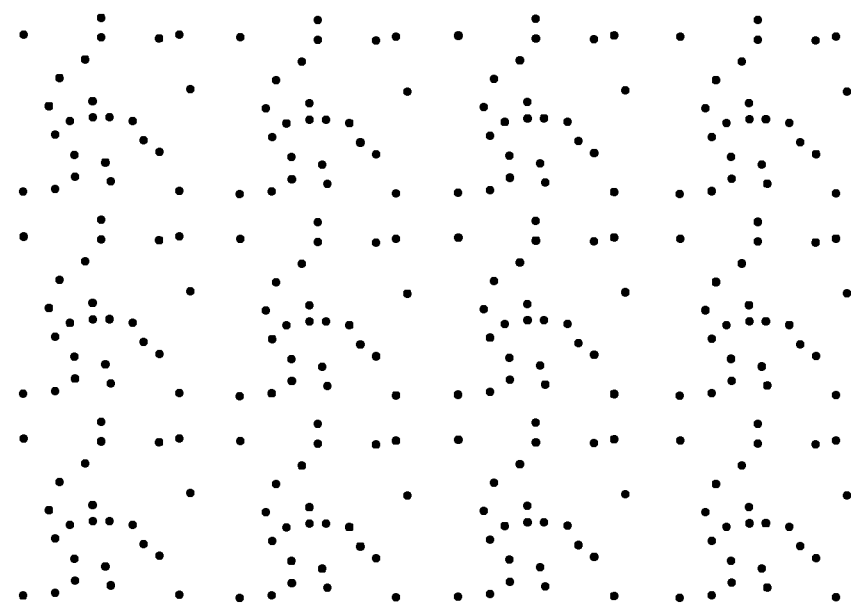
FIG. 8A shows the code of FIG. 4A applied in a tessellating manner.

FIG. 8A illustrates how the code may be formed, for example printed, in a tessellating manner on a container or an attachment according to the invention. The code is for example repeated at preferably regular intervals in columns and rows. Repeating the code on at least part of the surface of the container or the attachment allows reading of the code by the code processing subsystem even in cases where the container or the attachment is not perfectly aligned in the container processing subsystem of the preparation machine. It may also for example allow the code processing subsystem to read two or more codes in order to provide the system with some robustness against possible printing and/or reading errors.

Figure 8B:
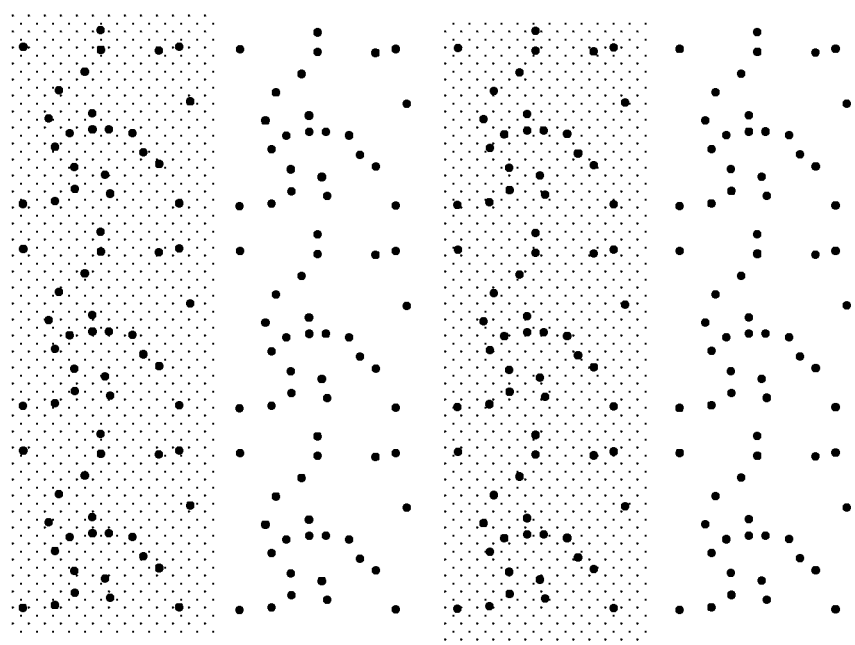
FIG. 8B illustrates the use of tessellating codes for encoding a plurality of sets of preparation information.

In embodiments, and with reference to FIG. 8B, two codes encoding different preparation information are formed in an alternate tessellating manner on at least part of a surface of a container or an attachment. A row comprises for example codes encoding a first set of preparation information, while the next row comprises a second code encoding a second set of preparation information. The preparation machine of the invention then reads and decodes one or the other code, or both codes, depending on the needs of the preparation. The first and second sets of preparation information for example correspond to preparation information for a first and a second phase of the container processing, alternative recipes for processing the content of the container, for example a cold and a warm recipe, etc.

Method of Processing Code

The code processing subsystem 18 processes the code 74 to determine the preparation information by: obtaining by means of the image capturing device 106 a digital image of the code; processing by means of the image processing device 92 digital data of the digital image to decode the preparation information; outputting by means of the output device 114 said decoded preparation information.

Processing of the digital data comprises: locating the units 76 in the code; identifying the reference configuration 88, for example the reference units 86, and determining therefrom a reference point 102 and/or a reference line 81; determining from said reference line an encoding line 904, 903 along which a sequence of data units 84, 85 is aligned and measuring distances between the data units 821, 822, 823, 824, 825, 826, 827, 828 of these sequence of data units 84, 85 and the respective intersection point 914, 913 and/or between the data units 821, 822, 823, 824, 825, 826, 827, 828 of the sequence of data units 84, 85 and other, for example adjacent, data units of the same or another sequence of data units 84, 85; decoding the sequence of operations of the preparation information from these distances.

Locating the units 76 in the code 74 is generally achieved by conversion of the pixels represented in the digital data to a one-bit bi-tonal black and white image, i.e. a binary image, whereby the associated conversion parameters are set to distinguish the units from their surrounding base level. Alternatively an oversampled binary image sensor may be used as the image capturing device 106 to provide the binary image. Locations of the centre of units may be determined by a feature extraction technique such as circle Hough Transform. Different sized units may be identified by pixel integration.

In embodiments, identification of the reference configuration 88, for example the reference units 86, and determining therefrom a reference point 102 and/or a reference line 81 for example comprises identifying a configuration 88 of units 76. Identifying a configuration of units may comprise locating units which have a particular unique configuration as discussed above. In particular, stored information relating to the geometry of the centre points of reference units comprising the configuration can be used to search for this arrangement in the located units.

Determining the reference line 81 from the reference configuration 88 may comprise determining from the configuration of a reference point 102 from which reference line 81 extends. In particular, the location of the reference point 102 in respect of the configuration may be part of the aforesaid stored information. Determining the reference line 81 from the reference configuration 88 may further comprise determining the reference line as extending through or parallel to one or more reference units of the configuration.

In embodiments comprising a plurality of such codes 74, as illustrated in FIG. 8A, determining the reference line 81 for a first code may comprise determining the reference line as extending from the reference point of the reference configuration of said first code and through or in relation to a reference point defined by the configuration of at least one other code. The arrangement of the reference line with respect to the reference points of further codes it will be appreciated is a stored relationship. Determining the reference line 81 of a code for example comprises two parts, or phases: a first phase comprises approximatively determining the reference line 81 using the reference configuration of the code itself, and a second phase comprises accurately determining, or correcting, the previously determined reference line 81 using the reference configuration of at least one other code, preferably of an adjacent code. The first phase for example comprises the steps of: determining from the reference configuration a reference point of the code from which reference line 81 extends; approximatively determining the direction of the reference line 81 from the reference configuration, for example as extending through or parallel to one or more reference units of the code. The second phase for example comprises the steps of: identifying a like configuration of another code, preferably of an adjacent code; determining a reference point of said another code; correcting the reference line 81 as extending through the reference point of the adjacent code or at a known position with respect to the reference point of the adjacent code.

Determining the reference point and the reference line 81 when processing the code allows determining the orientation of the code in the captured image prior to decoding the information. The image of the code may thus be captured in any direction without affecting the decoding accuracy. The container bearing the code thus doesn't need to be aligned in a specific orientation relative to the image capturing device, thereby simplifying the construction of the machine and the processing of the container in the machine. In that sense, it is not necessary to require the consumer to orientate the container before inserting it into the food or beverage preparation device. Usage of a container bearing a code according to the invention is thus user-friendly.

Determining for data units an encoding distance from the associated intersection point may be achieved by identification of single data units that are a predetermined and/or greatest distance away from other units or by identification of pairs of data units that are a predetermined distance apart; determining the circumferential, linear or angular distance measured from a reference point between the intersection point and the centre of the data unit or a determined point, for example a midpoint of a pair of data unit. Determining a circumferential distance is conveniently achieved by the product of: an angle in radians at the reference point 102 between the reference line 81 and a radial line to the data unit 82 or to the determined point of the pair of data units 820; and the overall circumference of the encoding line 90 (which is defined by the associated intersection point 91). Determining a distance may comprise determining an angular distance, i.e. by means of the angle in radians or degrees between the reference line 81 and a radial line to a data unit 82 (typically its centre), whereby the radial distance may be used to identify the data unit with respect to a reference position. The latter is preferable since less processing steps are required; moreover the precise radial distance is not required as long as there is no risk of confusion between data units on different encoding lines.

The determined distance can be corrected using the magnification and/or distance of the image capturing device 106 away from the code 74 when the image was captured.

Converting the determined encoding distance into an actual value of a parameter may comprise using stored information (e.g. information stored on the memory subsystem 112) which defines a relationship between the parameter and distance, for example a correspondence function as explained above. This step may be performed at the image processing device 92 or processing subsystem 50. The relationship may be linear, e.g. $Vp \propto d$. Alternatively it may be non-linear. A non-linear relationship may comprise a logarithmic relationship, e.g. $Vp \propto \log(d)$ or an exponential relationship, e.g. $Vp \propto e^d$. Such a relationship is particular advantageous when the accuracy of a parameter is important at low values and less important at high values or the converse e.g. for the second embodiment of the container processing subsystem 14 the accuracy of the angular velocities W1, W2 of the mixing unit are more important at a low angular velocity than at a high angular velocity, hence an exponential relationship is preferable.

As the circumference of the encoding lines 90 decreases with proximity to the centre of the encoding area 78 (i.e. the location of the reference configuration 88 in the illustrated examples) the accuracy of the determined distance is less.

Advantageously, the parameters that require a higher level of precision, or sequences of operations that require several encoding data units, can be arranged distal said centre and those that do not require a high level of precision can be arranged proximal said centre. As an example, for the second embodiment of the container processing subsystem 14, the accuracy of the angular velocities W1, W2 of the mixing unit are more important hence they are located distal said centre, and the accuracy of the percentage cooling power is less important hence it is located proximal said centre.

In embodiments comprising discrete positions 77, 79, processing of the digital data may further comprise determining the location of the discrete positions and determining if they comprise a data unit, and deriving therefrom a parameter, or a characteristic of a parameter, which may be encoded by a data unit along an encoding line 90.

Determining the location of discrete positions may comprise using the identified position of the reference line. It may further comprise using: stored information (i.e. information stored on the memory subsystem 112) e.g. there are a known number of discrete positions arranged at known locations with respect to the position of the reference line; and/or with respect to the arrangement of a data unit or a pair of data units along an encoding line which may encode the number and/or arrangement of discrete positions (e.g. certain positions of the data unit or pair of data units encode particular configurations of the discrete positions). Determining if the discrete positions comprise a data unit may comprise feature extraction or other known technique.

Deriving from the presence of the data units at the discrete positions a parameter may comprise using stored information (e.g. a look up table stored on the memory subsystem 112) to decode the encoded parameter(s).

Machine and Container Attachments

Figure 9:
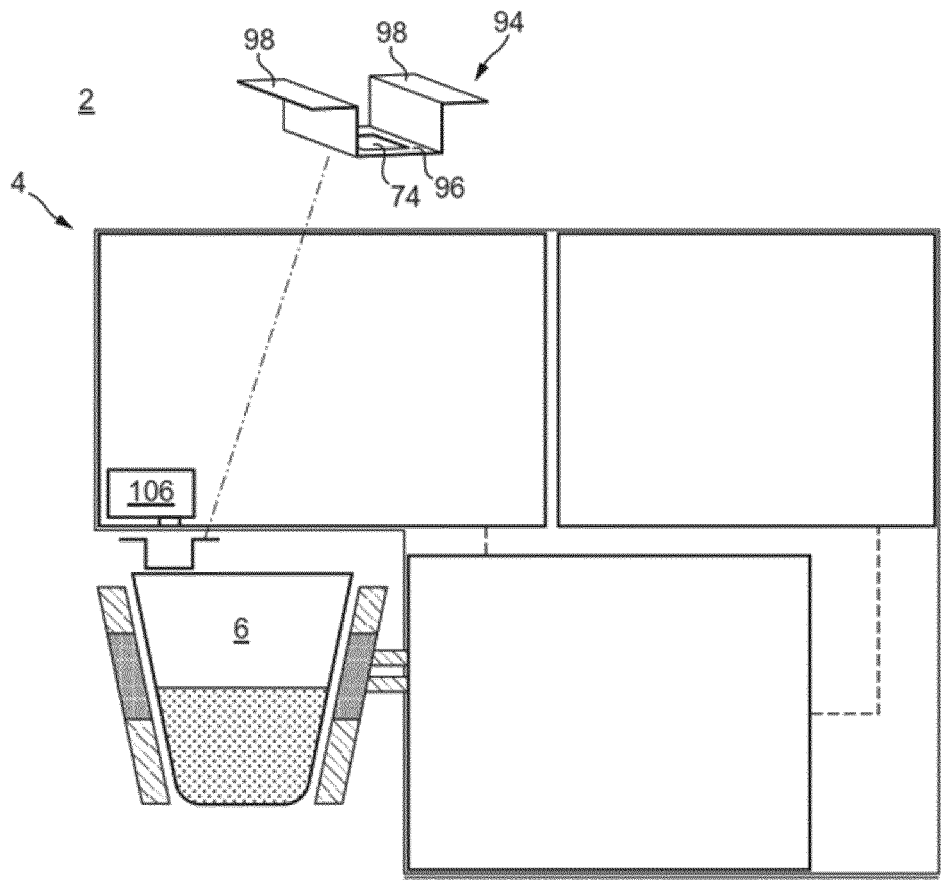
FIGS. 9 and 10 are diagrammatic drawings illustrating attachments for the system of FIG. 1 according to embodiments of the present disclosure.

An attachment 94 may comprise the afore-described code 74 arranged on a surface thereof, the attachment 94 configured for attachment to the afore-described beverage or foodstuff preparation machine 4. The attachment, an example which is illustrated in FIG. 9, comprises: a carrier 96 for carrying the code 74; an attachment member 98 for attachment of the carrier 96 to the machine 4 between an image capturing device 106 of said machine 4 and a container 6 received by said machine 4 and proximate said container. In this way an image of the code 74 can be captured by the image capturing device 106 as if it were attached to the container 6. Examples of suitable attachment members comprise: extensions attached to said carrier comprising an adhesive strip (as illustrated); a mechanical fastener such as a clip, bolt or bracket. The use of such an attachment 94 is particularly useful if: only one type of container 6 is used on the machine 4; a clean or other maintenance related operation is required.

Figure 10:
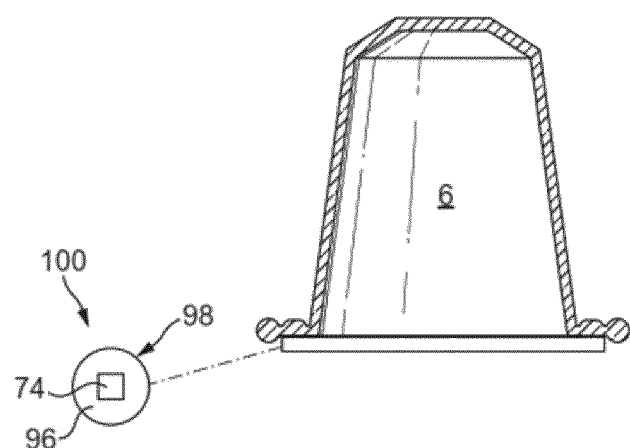

An alternate attachment 100 may comprise the afore-described code 74, arranged on a surface thereof, the attachment 100 configured for attachment to any of the afore-described containers 6. The attachment 100, an example which is illustrated in FIG. 10, comprises: a carrier 96 for carrying of the code 74; an attachment member 98 for attachment of the carrier 96 to the container 6. In this way an image of the code 74 can be captured by the image capturing device 106 as if it were formed integrally one the container 6. Examples of suitable attachment members comprise: an adhesive strip (as illustrated); a mechanical fastener such as a clip, bolt or bracket. The use of such an attachment 94 is particularly useful if: an end-user defined recipe is applied to the container 6; a clean or other maintenance related operation is required; it is more cost effective to form the code 74 on a substrate separate from the container 6 and attach said substrate to the container.

The invention claimed is:

1. A method of encoding preparation information, the method comprising forming a code on:
   a container for a beverage preparation machine or foodstuff preparation machine, the container for containing beverage or foodstuff material; or
   an attachment for attachment to the container or to a beverage preparation machine or foodstuff preparation machine;
   the method comprising:
   forming at least one reference configuration defining a virtual reference line of the code;
   defining a virtual encoding line intersecting the virtual reference line at an intersection point;
   forming a sequence of data units comprising at least two data units aligned at a distance from each other along the virtual encoding line for encoding a sequence of operations of the preparation information, each data unit of the sequence of data units encoding an operation of the sequence of operations; and
   a relative position of each data unit in the sequence of data units encodes a nature of the operation and wherein a distance between each data unit and the intersection point and/or a distance between each data unit and another data unit encodes a value of a condition for a performance of the operation.

2. The method according to claim 1, wherein the virtual encoding line is a closed line, and the distance between each data unit and the intersection point and/or the distance between each data unit and another data unit of the sequence of data units or of another sequence of data units is an angular distance measured from a center point.

3. The method according to claim 1, wherein the operation is one of a group of operations comprising:
   starting injecting a liquid in the container; stopping injecting the liquid in the container; opening a spout in fluid connection with the container; closing a spout in fluid connection with the container; starting mixing the beverage or foodstuff material contained in the container; and stopping mixing the beverage or foodstuff material contained in the container.

4. The method according to claim 1, wherein the condition for the performance of the operation is selected from the group consisting of:
   a duration, a volume, a temperature, a current intensity, and a voltage.

5. The method according to claim 1, wherein the code has a peripheral length of 600-1600 µm.

6. The method according to claim 1, wherein the container comprises a plurality of the codes arranged in a tessellating configuration.

7. The method according to claim 1, wherein the reference configuration comprises three reference units arranged at a vertices of a virtual triangle.

8. The method according to claim 1, wherein the operation comprises extracting the beverage or foodstuff material from the container.

9. The method according to claim 1, wherein the code is configured to be processed by a code processing subsystem, wherein the code processing subsystem comprises an image capturing device and an image processing device, and wherein the method further comprises:
   capturing, by the image capturing device, a digital image of the code; and
   decoding, by the image processing device, the code of the digital image.

10. The method according to claim 9, wherein the digital image comprises a black and white image, and wherein the image capturing device comprises an infrared image capturing device.

11. The method according to claim 9, wherein the code processing subsystem further comprises an output device, and wherein the method further comprises:
    outputting, by the output device, the preparation information decoded from the code to a processing subsystem of the beverage preparation machine or the foodstuff preparation machine.

* * * * *